US008270264B2

(12) United States Patent
Nakai

(10) Patent No.: US 8,270,264 B2
(45) Date of Patent: Sep. 18, 2012

(54) OPTICAL HEAD APPARATUS, OPTICAL DISK APPARATUS AND OPTICAL DISK

(75) Inventor: Kenya Nakai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/744,906

(22) PCT Filed: Aug. 28, 2008

(86) PCT No.: PCT/JP2008/065408
§ 371 (c)(1),
(2), (4) Date: May 26, 2010

(87) PCT Pub. No.: WO2009/069354
PCT Pub. Date: Jun. 4, 2009

(65) Prior Publication Data
US 2010/0309771 A1    Dec. 9, 2010

(30) Foreign Application Priority Data

Nov. 29, 2007    (JP) ................................. 2007-308281

(51) Int. Cl.
*G11B 7/00* (2006.01)
(52) U.S. Cl. .................... 369/44.11; 369/53.35
(58) Field of Classification Search ............... 369/44.41, 369/53.35
See application file for complete search history.

(56) References Cited

U.S. PATENT DOCUMENTS

| 5,257,250 A | 10/1993 | Moriya et al. |
| 5,442,615 A * | 8/1995 | Ohsato et al. ................. 369/100 |
| 5,774,444 A | 6/1998 | Shimano et al. |
| 5,889,752 A * | 3/1999 | Maeda et al. ............... 369/53.33 |
| 6,175,540 B1 * | 1/2001 | Kim ........................... 369/44.35 |

(Continued)

FOREIGN PATENT DOCUMENTS

JP    59-82337 U    6/1984

(Continued)

OTHER PUBLICATIONS

Fuji et al., "Observation of Eye Pattern on Super-Resolution Near-Field Structure Disk With Write-Strategy Technique", The Japan Society of Applied Physics, vol. 43, No. 7A, pp. 4212-4215, 2004.

(Continued)

*Primary Examiner* — Wayne Young
*Assistant Examiner* — Brenda Bernardi
(74) *Attorney, Agent, or Firm* — Birch, Stewart, Kolasch & Birch, LLP

(57) ABSTRACT

[Object] A recoding playback apparatus and an optical disk are provided that allows reduction of a low frequency noise at a time of playback of a super resolution optical disk including small record marks whose size is below the diffractive limitation, to enhance quality of a playback signal.
[Means for Solution] The reflective beams from the optical disk are received by dividing into outer portion beams and a center portion beam, and a playback signal is created by combining such beams based on respective different gains. Based on received amounts of light or amounts of low frequency noise in respective light receiving regions, adjustment or determination of gain values is made, or the optical head apparatus is optically adjusted, whereby the low frequency noise is optimally suppressed. Further, a specific region is provided on the optical disk for making the foregoing adjustment.

4 Claims, 22 Drawing Sheets

U.S. PATENT DOCUMENTS

| | | | | |
|---|---|---|---|---|
| 6,256,277 | B1 * | 7/2001 | Saga et al. | 369/59.24 |
| 6,580,670 | B2 * | 6/2003 | Kim et al. | 369/44.41 |
| 6,738,325 | B2 * | 5/2004 | Mashimo | 369/44.38 |
| 6,826,142 | B2 * | 11/2004 | Kim et al. | 369/124.12 |
| 6,965,550 | B2 * | 11/2005 | Nakao et al. | 369/53.23 |
| 7,054,246 | B2 * | 5/2006 | Ueno | 369/47.27 |
| 2004/0136281 | A1 * | 7/2004 | Yanagisawa et al. | 369/44.32 |
| 2009/0257340 | A1 * | 10/2009 | Nagata et al. | 369/121 |

FOREIGN PATENT DOCUMENTS

| | | |
|---|---|---|
| JP | 60-138748 A | 7/1985 |
| JP | 2-168434 A | 6/1990 |
| JP | 5-128584 A | 5/1993 |
| JP | 8-102081 A | 4/1996 |
| JP | 8-273187 A | 10/1996 |
| JP | 9-35320 A | 2/1997 |
| JP | 11-175976 A | 7/1999 |
| JP | 2001-67677 A | 3/2001 |
| JP | 2002-56550 A | 2/2002 |
| JP | 2002-324328 A | 11/2002 |
| JP | 2002-352441 A | 12/2002 |
| JP | 2003-257043 A | 9/2003 |
| JP | 2003-272217 A | 9/2003 |
| JP | 2004-79067 A | 3/2004 |
| JP | 2006-209898 A | 8/2006 |
| JP | 2006-286082 A | 10/2006 |
| WO | WO 2007/043663 A1 | 4/2007 |

OTHER PUBLICATIONS

Kikukawa et al., "Low Frequency Noise Reduction of Super-Resolution Near-Field Structure Disc With Platinum-Oxide Layer", ODS Technical Digest, ThC3, 2005.

Shintani et al., "Sub-Terabyte-Data-Capacity Optical Discs Realized by Three-Dimensional Pit Selection", Japanese Journal of Applied Physics, vol. 45, No. 4A, pp. 2593-2597, 2006.

* cited by examiner (a)

(b)

OPTICAL HEAD APPARATUS, OPTICAL DISK APPARATUS AND OPTICAL DISK

TECHNICAL FIELD

The present invention relates to optical head apparatuses, optical disk apparatuses that record information on or play back information from optical recording/playback media for use in a super-resolution system, and optical disks which information is recorded on or played back from using the optical disk apparatus.

BACKGROUND ART

Thus far, high-capacity optical disks of various kinds have been achieved by reducing the size of an information mark that is written on a disk track and also by making a wavelength of the laser beam for use in recording/playback shorter and adopting an objective lens of a larger numerical aperture, to reduce the size of a focus spot on a focusing surface.

In, for example, a CD (compact disc), its disk substrate serving as an optical transmissive layer (a transparent protective layer formed on an information recording layer, which is also called a transparent substrate) has a thickness of about 1.2 mm, a laser beam wavelength of about 780 nm and a numerical apertures (NA) of 0.45 of an objective lens are selected, with its recording capacity being 650 MB.

In a DVD (digital versatile disc), its optical transmissive layer has a thickness of about 0.6 mm, and a laser beam wavelength of about 650 nm and an NA of 0.6 are selected, resulting in a recording capacity of 4.7 GB.

In a higher-density BD (Blu-ray Disc), an optical disk whose optical transmissive layer thickness is 0.1 mm is used to determine the laser beam wavelength to be about 405 nm and the NA to be 0.85, thereby achieving a high capacity of 25 GB per layer.

Besides these discs, there is an HD DVD (high-definition digital versatile disc) and the like in which an optical disk whose optical transmissive layer thickness is 0.6 mm that is the same as that of the DVD is used to determine the laser beam wavelength to be about 405 nm and the NA to be 0.65, thereby achieving a high capacity of 18 GB or more.

In the field of optical recording, a high-density recording scheme has been researched in recent years which uses a super-definition optical disk on which a super definition mask layer is formed having a nonlinear optical absorption characteristic or a nonlinear optical transmission characteristic where an index of refraction varies depending on light intensity. In this scheme, by causing changes in the index of refraction in a localized high temperature zone or a localized high intensity zone in the focus spot of an optical disk, marks can be played back that is smaller than a diffraction limit $\lambda/(4NA)$ that is determined by optical elements of an optical disk apparatus—i.e., the numerical aperture NA of a converging lens and optical wavelength $\lambda$ (for instance, refer to Non-patent Document 1).

In such a super resolution optical disk, however, because a mask layer thereof absorbs light, larger playback energy is needed in comparison to that in a conventional optical disk. It is known that as a result, a low frequency noise level (or disk noise) contained in playback signals increase (refer to Non-patent Document 2, for example).

Non-patent Documents 1 and 2 relates to Super-RENS (super resolution near field structure) scheme, which is for a typical super resolution optical disk. In addition to this disk, another super resolution optical disk is proposed which is formed of a material having a nonlinear optical absorption characteristic or nonlinear optical transmission characteristic in which an index of refraction of the recorded information mark varies depending on light intensity (refer to Non-patent Document 3, for example). These are hereinafter collectively called super resolution optical disk.

[Non-patent Document 1]
"Observation of Eye Pattern on Super-Resolution Near-Field Structure Disk with Write-Strategy Technique", Jpn. J. Appl. Phys., Vol. 43, No. 7A, pp. 4212-4215 (2004)

[Non-patent Document 2]
"Low Frequency Noise Reduction of Super-Resolution Near-Field Structure Disc with Platinum-Oxide Layer," ODS, Technical Digest, ThC3 (2005)

[Non-patent Document 3]
"Sub-Terabyte-Data-Capacity Optical Discs Realized by Three-Dimensional Pit Selection," Jpn. J. Appl. Phys., Vol. 45, No. 4A, pp. 2593-2597 (2006)

DISCLOSURE OF THE INVENTION

Problem that the Invention is to Solve

A problem is created in that, in a super resolution optical disk from which information is played back or on which information is recorded using a conventional optical head apparatus or an optical head apparatus-mounted optical disk apparatus, because as described above, a large amount of low frequency noise is generated when playing back the information of the optical disk, the low frequency noise causes generation of a data demodulation error when the playback signals of the optical disk are demodulated into binary data.

The present invention is directed to overcome the above problem and provides an optical head apparatus capable of reducing an effect of a low frequency noise and of producing read data playback signals having less demodulation error, an optical disk apparatus including the optical head apparatus, that suppresses the low frequency noise, and an optical disk for use in the optical disk apparatus.

Means for Solving the Problem

An optical head apparatus comprises a semiconductor laser; an objective lens that focuses a light beam emitted from the semiconductor laser, to form a focus spot on an information recording layer of an optical disk; and a light receiving device that converts into an electrical signal an amount of a return optical beam created by the focus spot being reflected by the information recording layer, to detect a playback signal of the optical disk, a focal point error, and a tracking error, wherein the light receiving device includes a light receiving surface that is configured with a first light receiving surface that includes a plurality of light receiving elements that receives outer portions of the return optical beam, and a second light receiving surface that includes a light receiving element that receives a center portion beam of the return optical beam, and a plurality of signal level conversion unit that individually adjusts levels of electrical signals from the plurality of light receiving elements of the first light receiving surface and the light receiving device of the second light receiving surface, and wherein a signal obtained by combining together the electrical signals from the first light receiving surface and the second light receiving surface output from the plurality of signal level conversion unit, is output.

An optical head apparatus comprises a semiconductor laser; an objective lens that focuses a light beam emitted from the semiconductor laser, to form a focus spot on an information recording layer of an optical disk; and a light receiving device that converts into an electrical signal an amount of a return optical beam created by the focus spot being reflected by the information recording layer, to detect a playback signal of the optical disk, a focal point error, and a tracking error, wherein the light receiving device includes a light receiving surface that is configured with a first light receiving surface that includes a plurality of light receiving devices that receives outer portions of the return optical beam, and a second light receiving surface that includes a light receiving device that receives a center portion of the return optical beam, and wherein the plurality of light receiving devices of the first light receiving surface is disposed asymmetrical with respect to an intersection point of two mutually orthogonal split lines or equivalent split lines on quad-split light receiving surface used in an astigmatic method for focus controlling the objective lens.

The optical disk apparatus according to the present invention includes the above optical head apparatus.

The optical disk apparatus according to the present invention, which includes the above optical head apparatus, also includes a received light mount level detection unit that detect a received light amount level of a plurality of optical receiver elements in a first light receiving surface, or a playback signal level detection unit that detects a playback signal level from the plurality of optical receiver elements in the first light receiving surface.

The optical disk according to the present invention is a super resolution optical disk formed thereon with a super resolution mask layer, in which there are provided a region for gain-adjusting using gain adjustment unit and/or a region for adjusting a return optical beam to a predetermined position on the light receiving surface by moving at least one optical element of the optical head apparatus.

Advantageous Effects of the Invention

The apparatus according to the invention reduces a low frequency noise contained in the playback signals, to reduce a variation in the playback signal, thus achieving an accurate data playback. Further, when there exists a positional displacement between the light receiving surface and the return optical beam, or an asymmetrical intensity distribution of the return optical beam, the low frequency noise can be suppressed, thus allowing a playback characteristic of an optical disk to be stabilized, which provides enhanced reliability.

DESCRIPTION OF REFERENCE NUMERALS

Figure 1:
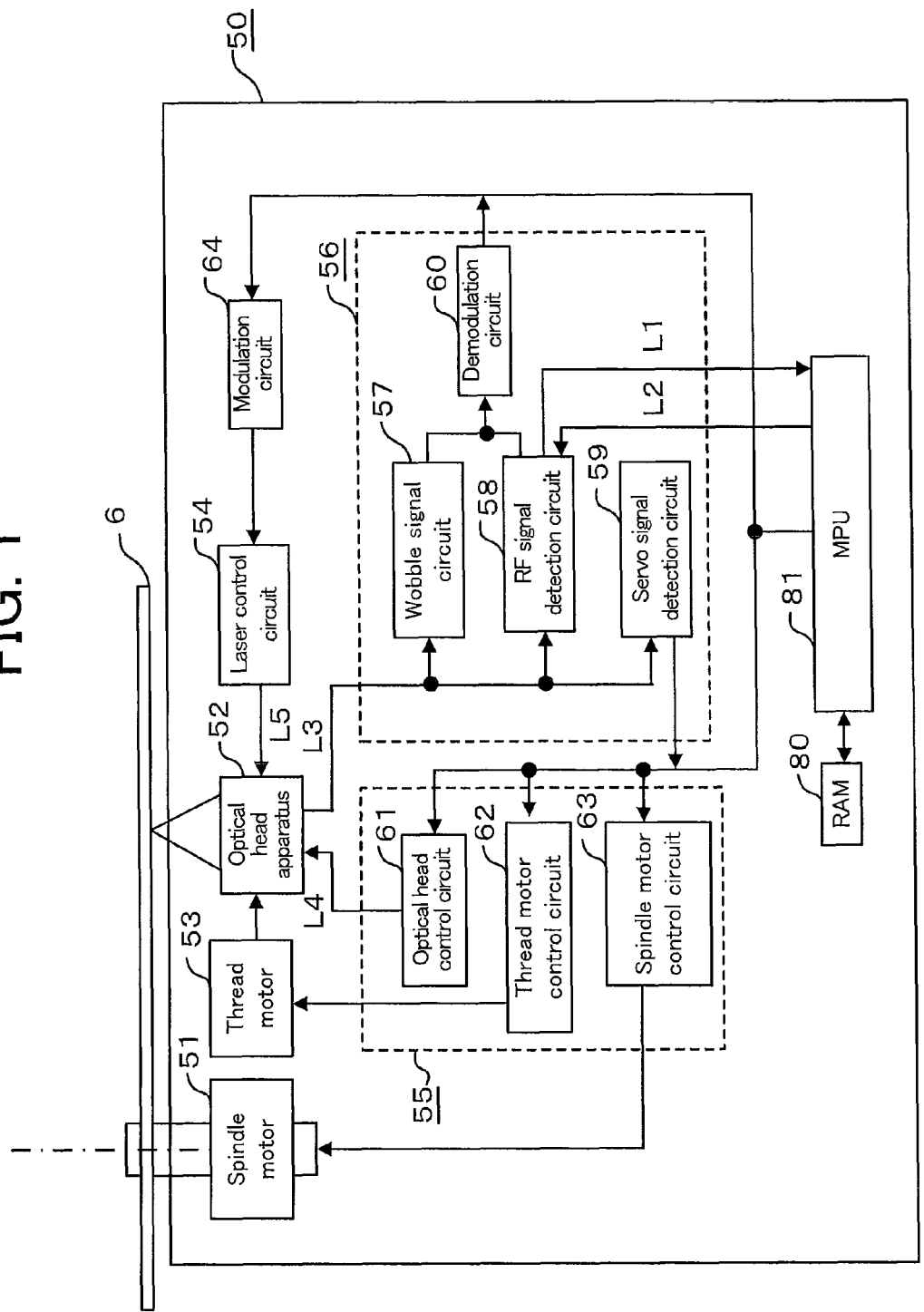
FIG. 1 is a diagram illustrating an overall configuration of an optical disk apparatus according to Embodiment 1 of the present invention.

1 Optical beam
2 Semiconductor laser
5 Objective lens

6 Optical disk
8 Light receiving surface
27 Light receiving device
50 Optical disk apparatus
52 Optical head apparatus
100 Focus spot
101, 102 Signal level converter
103 Signal level converter
105, 106 Low frequency noise amount detector
110, 111 Playback signal level detector
113 Received light amount level detector region
Q Return optical beam

BEST MODE FOR CARRYING OUT THE INVENTION

Embodiment 1

FIG. 1 is a view illustrating an overall configuration of an optical disk apparatus according to Embodiment 1. Here, arrows in FIG. 1, which indicate flows of typical signals and information, do not represent all connections between blocks constituting an optical disk apparatus 50.

Referring to FIG. 1, the optical disk apparatus 50 comprises a spindle motor 51 for rotationally driving an optical disk 6, an optical head apparatus 52 that shines a laser beam onto the optical disk 6 and then receives return light reflected by an information recording layer of the optical disk 6, to thereby generate signals, a thread motor 53 for driving the optical head apparatus 52 in a radial direction of the optical disk 6, a laser control circuit 54, a servo control circuit 55, a playback signal processing circuit 56, a modulation circuit 64, a Random Access Memory (RAM) 80, and a Micro Processing Unit (MPU) 81.

The servo control circuit 55 includes a spindle motor 63 that controls the spindle motor 51, a thread motor control circuit 62 that controls the thread motor 53 and an optical head control circuit 61 that controls the optical head apparatus 52, and each of which operates in response to commands issued by the MPU 81.

Furthermore, the playback signal processing circuit 56 includes a servo signal detection circuit 59 that generates a servo signal, based on a signal detected with the optical head apparatus 52 and transmitted via a transmission line L3, an RF signal detection circuit 58 that detects a playback signal RF to deliver it to a transmission line L1 as an output signal, and a wobble signal detection circuit 57 that detects a wobble signal derived from light reflected by a wobbling groove track of the optical disk 6.

The MPU 81 determines overall operations of the optical disk apparatus, based on output signals through the transmission line L1, such as status signals or signal amplitude value data detected with the RF signal detection circuit 58, or on output signals from other various circuits, and transmits control data (e.g., signals from the MPU 81 to the RF signal detection circuit 58 through a transmission line L2) to respective circuits, to control such circuits.

Here, the apparatus may also be configured in which the operations of constituent elements of the playback signal processing circuit 56 are partially processed within the MPU 81.

The RAM 80 is configured with a program region and a data region. The MPU 81 determines control operation from signals transmitted from the respective circuits, as well as controlling operations of the respective circuits, according to computer programs stored in the RAM 80.

The optical head control circuit 61 supplies, based on a servo error signal transmitted from the servo signal detection circuit 59 and an operation command from the MPU 81, a control signal via a transmission line L4 to the optical head apparatus 52, to control light to be shone from the optical head apparatus 52 onto the optical disk 6.

The thread motor control circuit 62 and the spindle motor control circuit 63 control the thread motor 51 and the spindle motor 53, respectively, based on an operation command from MPU 81 and a servo error signal.

Output signals from the wobble signal detection circuit 57 and the RF signal detection circuit 58 are demodulated into information data at a demodulation circuit 60.

Data delivered from the MPU 81 is partially converted in a demodulation circuit 64 into a recording signal suitable for recording onto the optical disk 6, and the recording signal is sent to the laser control circuit 54. Based on this recording signal, a control signal is sent from the laser control circuit 54 via a transmission line L5 to the optical head apparatus 52, thereby controlling an emission power of a semiconductor laser mounted on the optical head apparatus 52.

The optical disk 6 according to Embodiment 1 is a super resolution optical disk formed with a super resolution mask layer having a nonlinear optical absorption characteristic or a nonlinear optical transmission characteristic.

The optical head apparatus 52 is compatible with not only non-super resolution optical disks such as CDs, DVDs, BDs and HD DVDs, but also super resolution optical disks. The optical head apparatus 52 receives return optical beams reflected by an information recording layer of the optical disk 6, as well as focusing optical beams from the semiconductor laser on the optical disk 6, and thereby detects signals for generating playback signals and servo signals.

Next, the relationship between a signal component, and a low frequency noise component, contained in a playback signal of the optical disk 6, and that between such components and a read error will be described below.

The principle on which the optical disk 6 is played back is that a light receiving device detects return light diffracted by marks on the information recording layer of the optical disk 6, due to lands and pits or the difference in index of refraction, and then obtain a playback signal corresponding to the return light intensity. This playback signal includes a random noise component inherent to the disk, in the lower region of a space frequency. This random noise is called low frequency noise.

Figure 2:
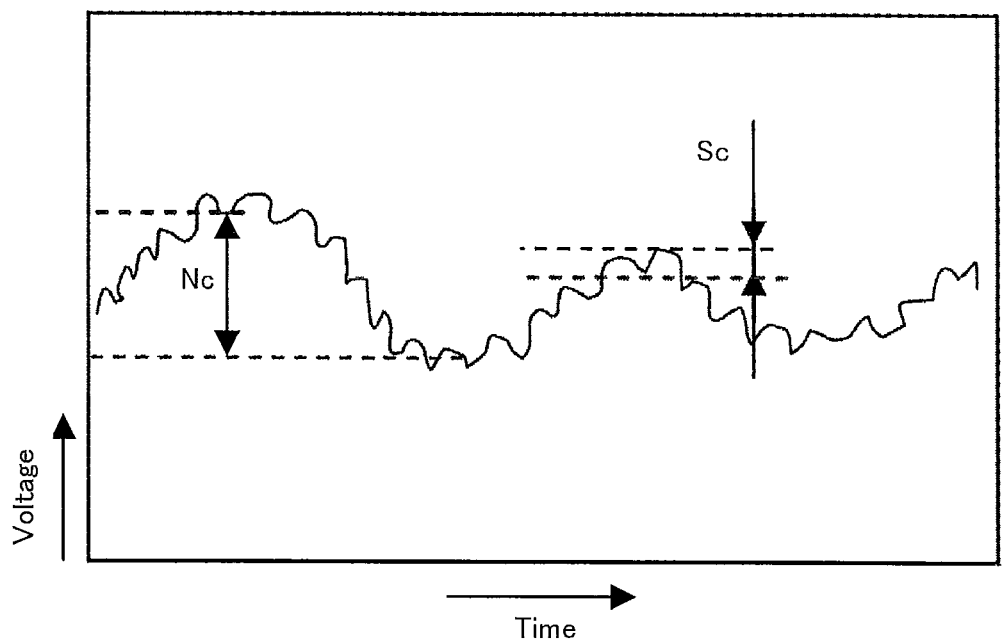
FIG. 2 is a diagram of a playback signal waveform of a super resolution optical disk containing a low frequency noise according to Embodiment 1 of the present invention.

FIG. 2 is an example a waveform of a playback signal including the low frequency noise, and its horizontal axis represents a time and its vertical axis, a voltage of the playback signal. As shown in FIG. 2, a noise component Nc larger in amplitude than a playback signal Sc is superposed with the playback signal Sc, thereby causing the playback signal waveform to vary with its amplitude larger than that of the playback signal. Such a waveform variation may be a cause of the read error occurring when the data is demodulated.

Figure 3:
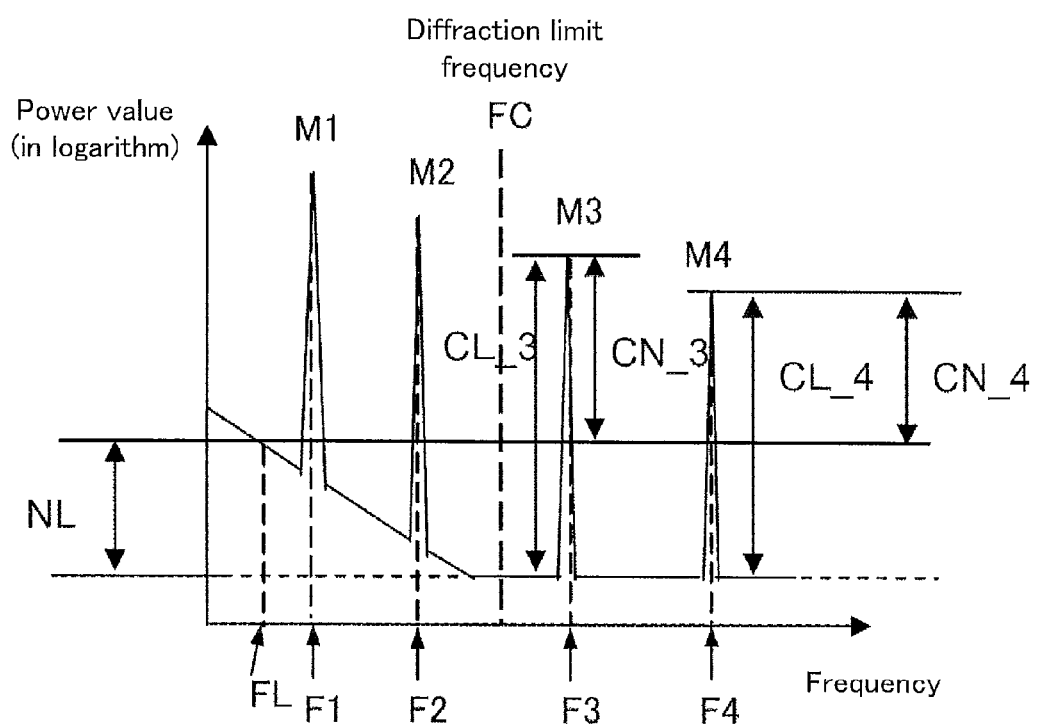
FIG. 3 is a diagram illustrating a frequency spectrum of the playback signal of the super resolution disk according to Embodiment 1 of the present invention.

FIG. 3 is a view illustrating a frequency spectrum associated with the playback signal time domain of the super resolution disk, and its horizontal axis represents a frequency and its vertical axis, a power value of the signal component (shown in logarithm).

From a spectrum analysis of the playback signal, there exists a playback signal component corresponding to a recording marker train of M1, M2, M3 and M4 corresponding to four different space frequencies as shown in FIG. 3, and the optical disk low frequency noise (disk noise) component in the lower region. The low frequency noise component has a tendency to increase with reducing space frequency. In the figure, a playback data pattern does not mean random pattern data, but shows an example of a pattern in which a fixed marker train of, e.g., four space frequencies F1 to F4 (where F1<F2<F3<F4) continues alternately. Symbol Fc in FIG. 3 is a cut-off frequency (where F1<F2<Fc<F3<F4) of the resolution corresponding to a diffraction limit λ/(4NA) determined by an objective lens numerical aperture NA and a wavelength λ.

In FIG. 3, signals corresponding to the markers M3 and M4 located at a higher region than the diffraction limit frequency Fc represent super resolution playback signals that are played back using a super resolution effect. On the other hand, signals corresponding to the markers M1 and M2 located at a lower region than the diffraction limit frequency Fc represent non-super resolution playback signals using a diffraction phenomenon. A relatively large low frequency noise is superposed with the signals corresponding to the markers M1 and M2 located at a lower region than the diffraction limit frequency Fc. A frequency noise level NL at a space frequency FL in a lower region than the space frequency F1 in FIG. 3 is hereinafter deemed a representative of the noise level. The lower the low frequency noise level NL of playback signals, the smaller the random variation in the amplitude of the playback signal component.

When quantitatively comparing the quality of the playback signal, a ratio of the playback signal component level CL (carrier level) to the low frequency noise level NL (noise level)—a value of CL/NL (hereinafter called CN ratio)—is an important index. The larger the CN ratio, the better the quality of signal because the noise component with respect to the playback signal component is relatively small.

In FIG. 3, the power value in the vertical axis is shown in logarithm; thus, CN_3 represents a CN ratio of the super resolution playback signal corresponding to the markers M3, and CN_4, a CN ratio of the super resolution playback signal corresponding to the markers M4, for instance. The following description will be made using this CN ratio.

Figure 4:
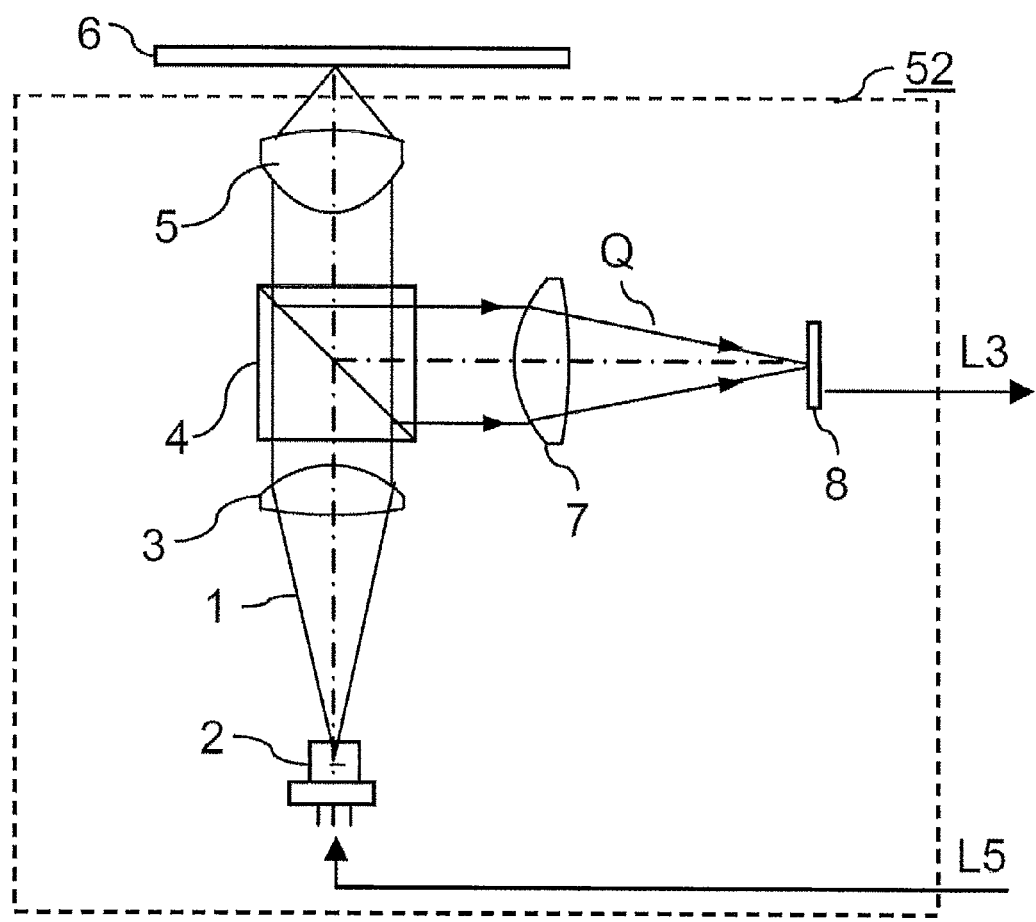
FIG. 4 is a diagram view illustrating a configuration of an optical head apparatus according to Embodiment 1 of the present invention.

FIG. 4 is a view illustrating an example of a configuration of the optical head apparatus according to the invention. Referring to FIG. 4, a light beam 1 of a wavelength λ, emitted from a semiconductor laser 2 in response to control signals externally supplied via the transmission line L5, is converted into a substantially collimated light beam through a collimator lens 3, passes through a beam splitter 4, and is focused onto an optical disk 6 by an objective lens 5. A return optical beam Q reflected by the optical disk 6 is again collimated through the objective lens 5 into a substantially collimated light beam that is reflected by the beam splitter 4 and then passed through a converging lens 7 into a converged light beam. A light receiving device 27 receives the converging light beam and supplies output electrical signals according to the amount of received light energy to the transmission line L3.

Besides the configuration of FIG. 4, for instance, a polarization beam splitter may be disposed in place of the beam splitter 4 and a one-quarter wavelength plate be interposed between the polarization beam splitter and the objective lens 5. This allows enhancement in light utilization efficiency.

Further, an objective lens drive actuator that drives the objective lens 5 in its optical axis direction and a direction orthogonal to its optical axis direction may be placed in a way that corrects an error in the focal distance of the objective lens 5 that occurs because of positional variations of the optical disk 6 in the optical axis direction of the objective lens 5 and in the direction orthogonal to its optical axis direction, when the optical disk 6 rotates.

Besides a detector optical system of the playback signal of the optical disk, there may be placed a sensor optical system for detecting an amount of focal point error of the objective lens 5 and an amount of tracking error with respect to the information recording layer of the optical disk 6.

The sensor optical system is configured with a sensor device that is disposed between the converging lens 7 and the light receiving device 27, according to a detection object such as the focal point error and the tracking error; and the light receiving device 27 that includes a plurality of light receiving elements capable of receiving a light beam added with astigmatism by the sensor device or a split light beam, and converting the received light beams into electrical signals.

Figure 5:
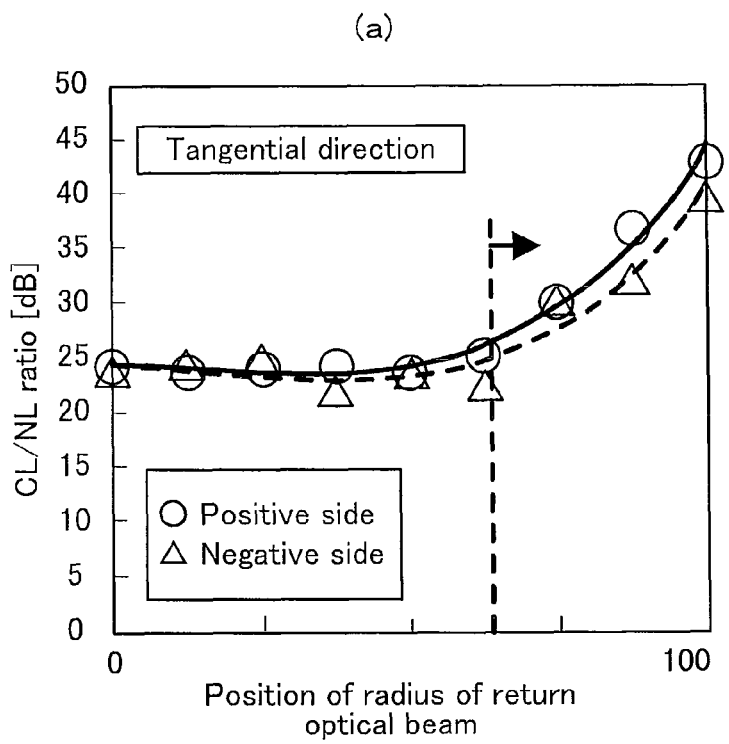
FIG. 5 shows diagrams illustrating actual measurement results of C/N ratios of signals from a center portion to outer portions of a return optical beam in the optical head apparatus according to Embodiment 1 of the present invention.
Figure 5:
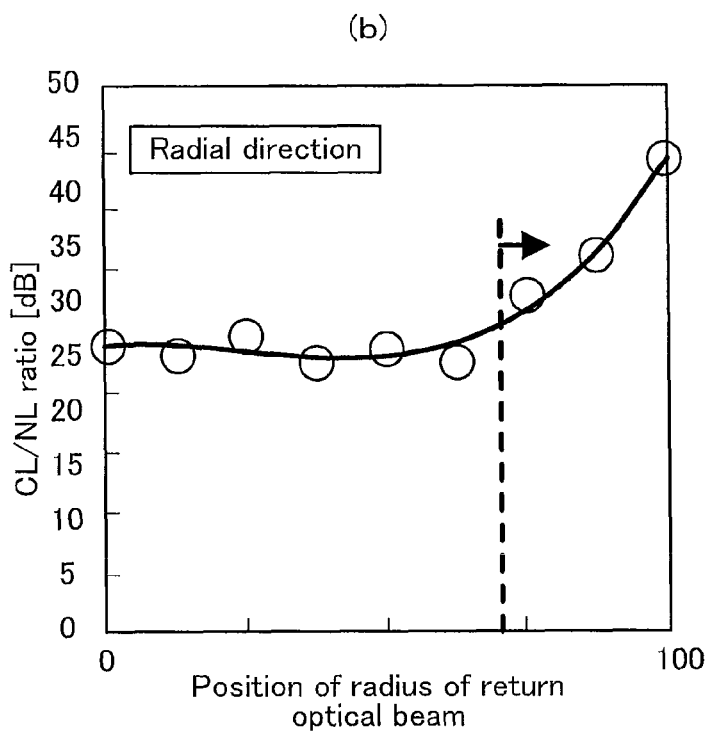

FIG. 5 shows a result of measuring a radial distribution of the return optical beam Q, with respect to the low frequency noise in the return optical beam Q. FIGS. 5A and 5B show a distribution of the CN ratio (CL/NL ratio) of the light beam 9 in the tangential direction (i.e., the direction corresponding to the data track direction) and that in the radial direction (i.e., the direction corresponding to the radial direction of the optical disk) of the optical disk 6, respectively. The horizontal axis represents a distance from the center to the outer portion of the return optical beam Q, showing values where the radius of the return optical beam Q is normalized as 100. That is, the position zero in radius represents the center of the return optical beam Q, the position 100 in radius, the periphery of the beam Q. FIG. 5A shows the CN ratio at the positive side from the center of the return optical beam Q and the CN ratio at the negative side, reversely therefrom.

The results of FIG. 5 reveal that, in either of tangential direction or radial direction, the CN ratio increases as the position approaches the outer portion of the return optical beam Q.

For this reason, of the overall return optical beam Q, if the outer portion beam can be detected with emphasis on it, or only the outer portion beam can be detected, then the playback signal with a greater CN ratio can be obtained.

The CN ratio distribution of FIG. 5 indicates that the CN ratio increases significantly at an outside region (right-hand region from dotted lines in the figure) of about 60% radius spaced apart from the middle (or the center) of the return optical beam Q, and this region is a particularly effective region for detection of the playback signal with the greater CN ratio.

In addition, the result of FIG. 5A indicates that, in the CN ratio in the tangential direction, the CN ratio on the negative side from the center of the return optical beam Q tends to be smaller in comparison to that on the positive side therefrom.

The configuration of the head apparatus that detects the outer portion of the overall return optical beam Q with emphasis on the portion, or detects only the outer portion of the beam Q, will be described below.

FIGS. 6A through 6C show configurations where the outer portion beam can be emphasized relative to the center portion beam of the return optical beam Q to detect the playback signal.

FIG. 6A is a diagram showing a configuration of the converging lens 7 and a light receiving surface 8a, and FIG. 6B, a configuration of the receiving device 27 including the light receiving surface 8a. Referring to FIG. 6B, the light receiving device 27 is configured with the light receiving surface 8a, three-way split, of light receiving elements A and B capable of detecting the outer portions of the return optical beam Q, and a light receiving element C capable of detecting the center portion of the return optical beam Q, and a signal arithmetic operation unit 109 that performs operations of amplification, addition and subtraction, and their combination, of signals from the light receiving elements. The light receiving surface

8a and the signal arithmetic operation unit 109 may be configured either integrally or separately.

From the configuration of FIG. 6B, a signal obtained by combining the following two signals is used for a playback signal. One of them is obtained by amplifying by a gain K1 output signals Sa and Sb of the light receiving elements A and B, respectively—each of which is the first light receiving surface of the split light receiving surface 8a—and then by summing both amplified signals together, and the other is obtained by amplifying by a gain K2 the output signal Sc of the receiving element C—which is the second light receiving surface. That is, the playback signal RF is generated based on an equation: RF=K1×(Sa+Sb)+K2×Sc. Note that each of the gain values is a positive or a negative value, depending on the circumstances, and its magnitude is greater or smaller than a value one, depending on the circumstances. This holds for all the gains that will be discussed below.

To dispose the light receiving elements A and B so that the CN ratio of the playback signal becomes greater, the receiving surface 8a is caused to move in a D1 direction of FIG. 6A, to optimally adjust the position of the return optical beam Q relative to the receiving surface 8a so that the CN ratio of the playback signal becomes a maximum.

Alternatively, moving the converging lens 7 of FIG. 6A in the D1 direction allows the movement of the relative position of the return optical beam Q on the light receiving surface, as with the description above.

Further, the converging lens 7 or the light receiving surface 8a is caused to move in the direction of D2 of FIG. 6A, to change a distance between the lens 7 and the receiving surface 8a, thereby allowing the magnitude of a diameter of the return optical beam Q on the receiving surface to vary, and also allowing the amount of light received on the light receiving elements A and B—the outer portions of the return optical beam Q—to be optimally adjusted so that the CN ratio of the playback signal becomes a maximum.

Moreover, as shown in FIG. 6C, from the light receiving surface 8b where the light receiving element C—which is the second light receiving surface of the light receiving surface 8a—is split into light receiving elements C1 and C2, output signals Sa, Sb, Sc1 and Sc2, each of which is an output from each light receiving element, are obtained. Then, an operation value RES=(Sa+Sc1)−(Sb+Sc2) is calculated from such output signals, and based on this value the light receiving surface 8b can also be disposed at a position to optimize the CN ratio. This is effectual when the outer portion where the CN ratio becomes greater is asymmetrically distributed relative to the center of the optical axis of the return optical beam Q; the foregoing RES is set to a predetermined target value that maximizes the CN ratio so that this asymmetrical distribution is corrected.

A configuration where the center portion of the return optical beam Q is light-shielded to detect the playback signal only in the outer portion thereof will be described below with reference to FIGS. 7A and 7B.

Figure 7:
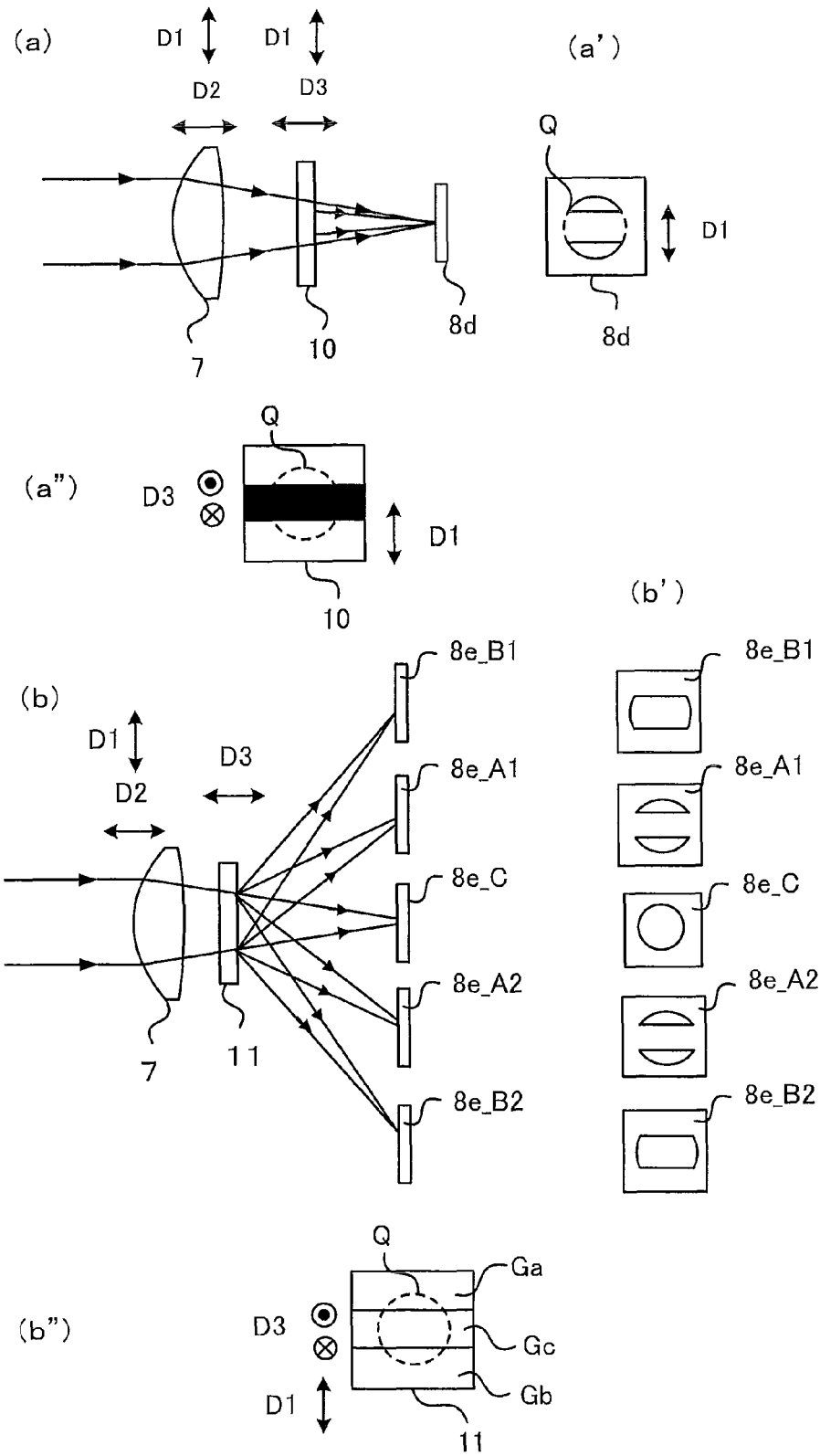
FIG. 7 shows diagrams illustrating another optical configuration of the optical head apparatus according to Embodiment 1 of the present invention.

In FIG. 7A (FIG. 7A", which is a plan view of numeral 8d, and FIG. 7 A", which is a plan view of numeral 10, are collectively referred to as FIG. 7A), the optical head apparatus is configured with the converging lens 7; a light-shielding element 10 that passes only the outer portion of the return optical beam Q therethrough, with the light beam in the center portion of the return optical beam Q shielded or reduced; and a light receiving surface 8d that detects the outer portion of the return optical beam Q that has passed through the light-shielding element 10. A black portion of the light-shielding element 10 is a portion that shields or reduces the return optical beam Q. A spot of the split return beam Q is formed on the light receiving surface 8d.

Figure 6:
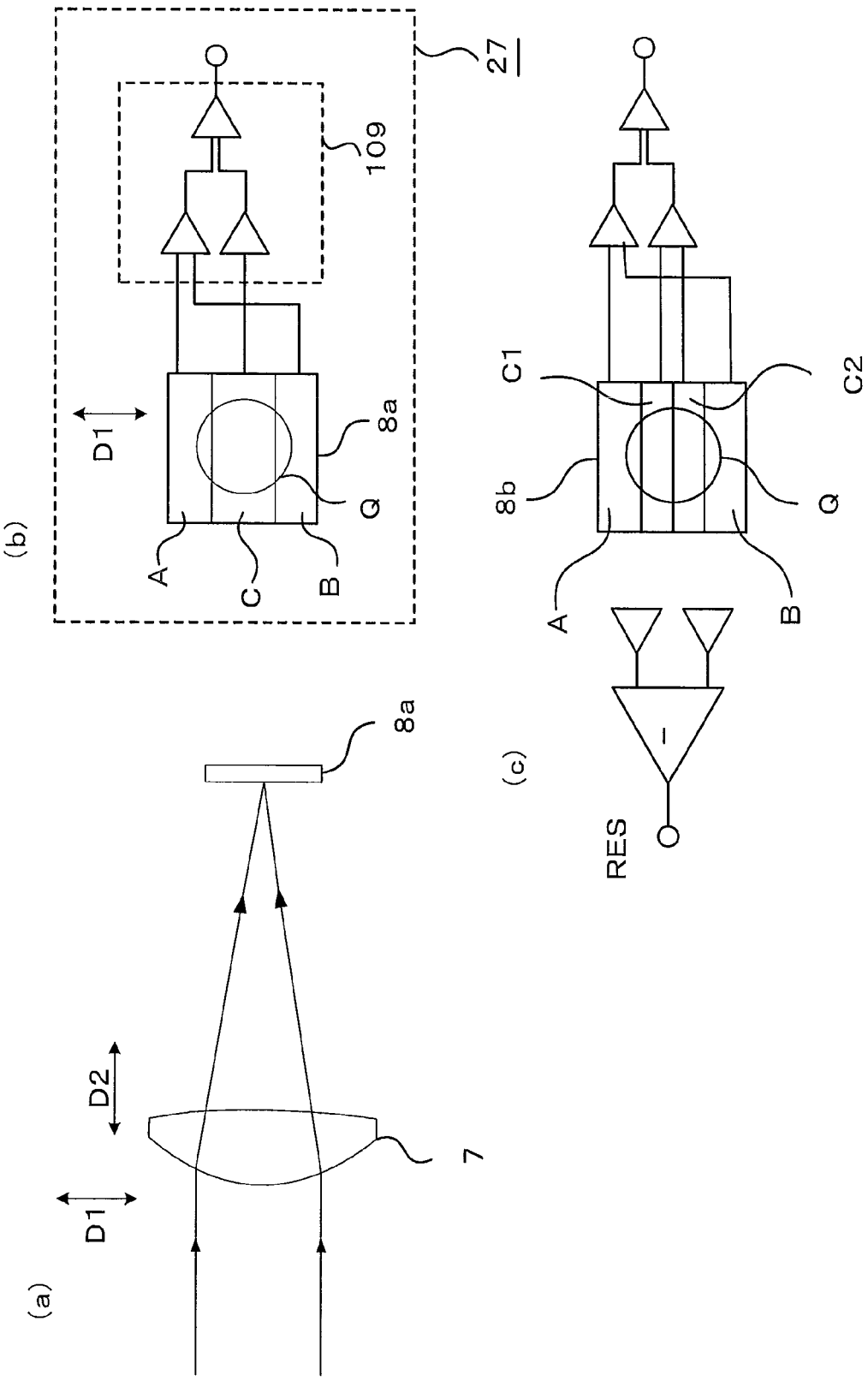
FIG. 6 shows diagrams illustrating an optical configuration of the optical head apparatus according to Embodiment 1 of the present invention.

While in FIG. 7A the light receiving surface 8d made up of a single light receiving element receives a light beam, a light receiving surface having a light receiving element capable of separately detecting the outer portion beam and the center portion beam may receive the light beam, as shown in FIGS. 6B and 6C, and the detection of the playback signal RF similar to that in FIG. 6 may also be conducted.

Also in the configuration of FIG. 7A, as with the configuration in FIG. 6, the light receiving surface 8d, the converging lens 7 or the light-shielding element 10 is caused to move in the D1 direction of FIG. 7A, to optimally adjust the position of the return optical beam Q relative to the receiving surface 8d so that the CN ratio of the playback signal becomes a maximum.

Further, the light-shielding element 10 is caused to move in a D3 direction relative to the converging lens 7, or the converging lens 7 to move in the D3 direction, thereby allowing an outer portion area of the return optical beam Q passing through the light-shielding element 10 to be adjusted so that the CN ratio of the playback signal becomes a maximum.

Further, as shown in FIG. 7B (FIG. 7B', which shows plan views of 8e_C, 8e_A1, 8e_A2, 8e_B1, and 8e_B2, and FIG. 7B", which is a plan view of numeral 11, are collectively referred to as FIG. 7B), a diffraction element 11 may be applied in place of the light-shielding element 10 that reduces the amount of light in the center portion of the return optical beam Q. In the diffraction element 11, regions Ga and Gb that diffract the outer portions of the return optical beam Q and a region Gc that diffracts the center portion beam thereof are formed with different diffraction patterns that diffract and separate the beam Q in different directions. This forms spots of the return optical beam Q as shown in FIG. 7B at respective light receiving surfaces 8e_C, 8e_A1, 8e_A2, 8e_B1, and 8e_B2.

If output signals detected at the light receiving surfaces 8e_C, 8e_A1, 8e_A2, 8e_B1 and 8e_B2, where the outer portions and the center portion of the return optical beam Q diffracted and separated by the diffraction element 11 are individually received, are designated as Sc, Sa1, Sa2, Sb1 and Sb2, the playback signal RF is generated based on an equation: RF=K1×(Sa1+Sa2)+K2×(Sb1+Sb2), where K1 and K2 each represent a gain.

Although, in FIG. 7B, each of the light receiving surfaces, made up of a single light receiving element, receives a light beam, a light receiving element having a light receiving surface pattern capable of individually detecting the outer portion beam and the center portion beam as shown in FIGS. 6A and 6B, may be used to receive the light beam, allowing detection of the playback signal similar to the case of FIG. 6.

Also in the configuration of FIG. 7B, the position of the return optical beam Q relative to the receiving surface can optimally be adjusted so that the CN ratio of the playback signal becomes a maximum, by moving the light receiving surface 8e, the converging lens 7 or the diffraction element 11 in the D1 direction shown in FIG. 7B, and further by moving the converging lens 7 in the D2 direction or the diffraction element 11 in the D3 direction.

Next, a configuration where the outer portion of the return optical beam Q is detected with emphasis on it relative to the center portion beam thereof to generate the playback signal will be described below with reference to FIGS. 8A through 8E.

The optical head apparatus in FIG. 8A (FIG. 8A', which is a plan view of numeral 12, is collectively referred to as FIG.

8A) is configured with the converging lens 7, a diffraction element 12 that splits or separates the return optical beam Q into a plurality of light beams, and a plurality of light receiving surfaces $8f\_1$, $8f\_2$ and $8f\_0$ that receive a plurality of light beams split or separated by the diffraction element 12.

FIG. 8B is a view illustrating the configuration of the light receiving device 27 including such light receiving surfaces. The light receiving device 27 includes the surface $8f\_1$ divided into light receiving elements $8f\_A1$, $8f\_B1$ and $8f\_C1$, the surface $8f\_2$ divided into light receiving elements $8f\_A2$, $8f\_A2$ and $8f\_C2$, a light receiving element $8f\_0$, and the signal arithmetic operation unit 109. The three light receiving surfaces and the signal arithmetic operation unit 109 may be configured integrally or separately. The light receiving surface $8f\_1$ receives a positive first order diffraction light beam Q1 diffracted through a diffraction element 12, the light receiving surface $8f\_2$, a negative first order diffraction light beam Q2 distracted therethrough, and the light receiving surface $8f\_0$, a zero-order diffraction light beam Q0 diffracted therethrough.

The light receiving elements $8f\_A1$ and $8f\_B1$ and the light receiving elements $8f\_A2$ and $8f\_B2$ detect the outer portions of the return optical beam Q, and the light receiving elements $8f\_C1$ and $8f\_C2$, the center portions thereof.

When, as shown in FIG. 8B, the light receiving surface is split by split lines substantially orthogonal to a direction in which the return optical beam Q is diffracted and separated, turning the diffraction element 12 in the D4 direction of FIG. 8A (rotation direction about an optical axis of the return optical beam Q) allows only the positive and negative first order diffraction light beams Q1 and Q2 to be turned in the D4 direction about the zero-order diffraction light beam Q0. For that reason, with split lines J1 and J2 of the light receiving surface mutually oblique (non-parallel) relative to a direction in which the return optical beam Q is diffracted and separated, the outer portion areas of the return optical beam Q to be detected by the light receiving elements $8f\_A1$ and $8f\_B1$ and the light receiving elements $8f\_A2$ and $8f\_B2$ can optimally be adjusted so that the CN ratio becomes a maximum, as the diffraction element 12 turns, thus allowing reduction of an influence of a positional error resulted from a variation in diameter of the return optical beam Q or the like.

In addition, moving the diffraction element 12 in the D3 direction causes each of the diffracted light beams of the return optical beam Q on the receiving surface to be displaced in the D3 direction. This reduces an effect of a position error in the positive and negative first order diffraction light beams Q1 and Q2 of the foregoing return optical beam Q.

Furthermore, as is the case with the configurations of FIGS. 6 and 7, moving the converging lens 7 in the D1 and D2 directions allows a change of a position and an optical flux diameter of each diffraction light beam of the return optical beam Q on the light receiving surface, thus enabling extraction and detection of the outer portions of the return optical beam where the CN ratio is greater.

Light receiving surface patterns illustrated in FIGS. 8C through 8E may be selected in lieu of the light receiving surface shown in FIG. 8B. FIG. 8C shows patterns of substantially 90 degree rotation of the split line direction—i.e., patterns where the light receiving surface is split by the split lines substantially in parallel to the direction where the return optical beam Q is diffracted and separated. However, two split lines dividing the detection area into the center portion and the outer portions are non-parallel as is the case with FIG. 8B.

In the light receiving surfaces of FIGS. 8D and 8E, the two split lines dividing the detection area into the center portion and the outer portions are substantially in parallel; however, the light receiving surface is split by the split lines that are non-parallel and non-orthogonal to the direction where the return optical beam Q is diffracted and separated.

In FIGS. 8B through 8E, an angle defined by each of the two split lines and the direction where the return optical beam Q is diffracted and separated or a direction orthogonal to this direction is preferably one degree through five degrees.

Figure 8:
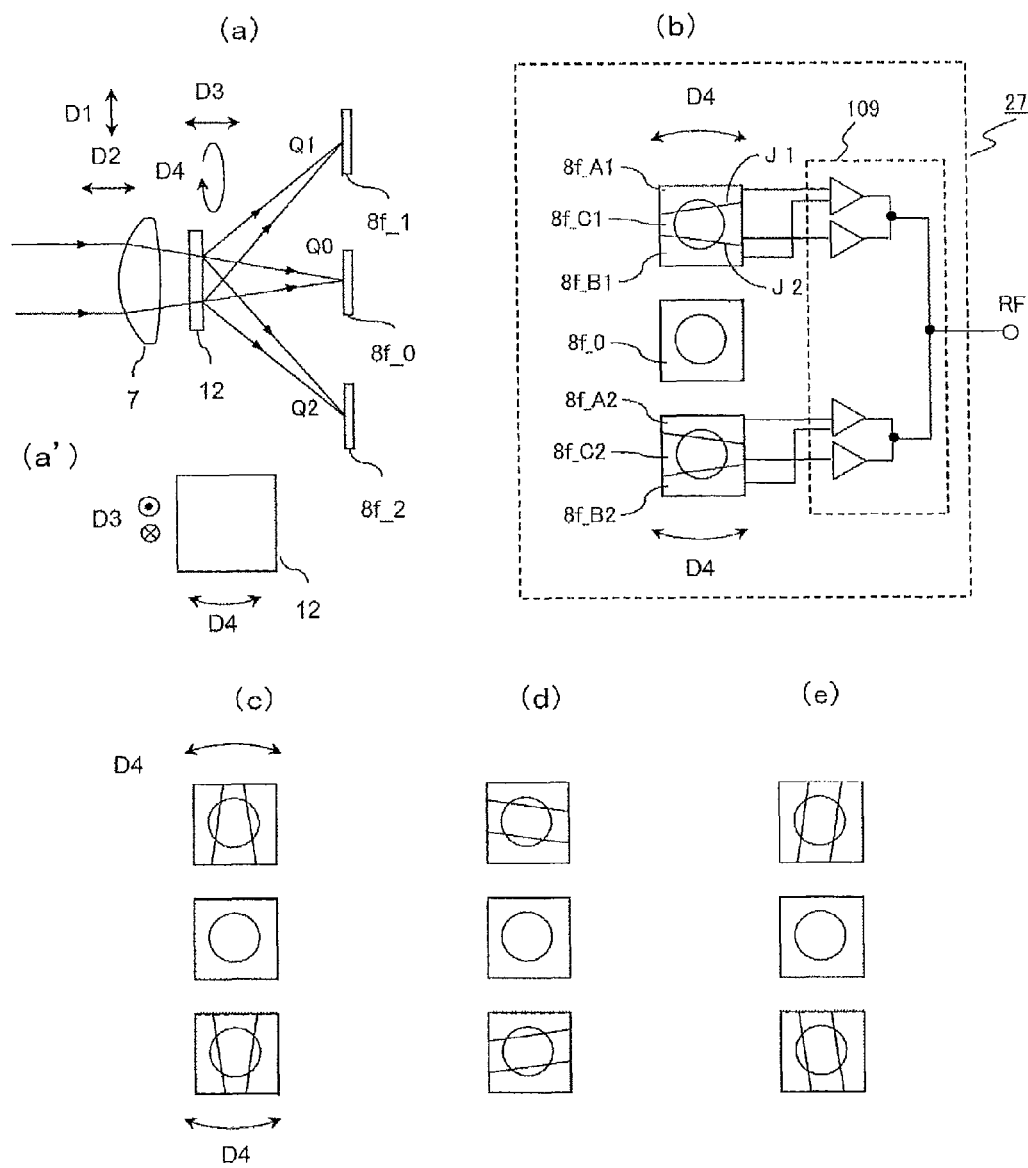
FIG. 8 shows diagrams illustrating another optical configuration of the optical head apparatus according to Embodiment 1 of the present invention.

In the respective light receiving surfaces of the light receiving devices shown in FIGS. 6 through 8, no mention is made as to whether the split direction of the light receiving surface for detection of the outer portions of the return optical beam Q is a direction corresponding to the tangential direction of the optical disk 6 or to the radial direction thereof; however, as described in reference to FIG. 5, because there is observed an increase of the CN ratio from the center toward the outer portion of the return beam Q, in both of the tangential and radial directions, the similar advantageous effect of the increase in the CN ratio can be achieved in whichever direction the surface is split.

In FIGS. 6 through 8, the light receiving surface is disposed at a position where the return optical beam Q is focused; however, it may be placed on a location other than the focus position.

Figure 9:
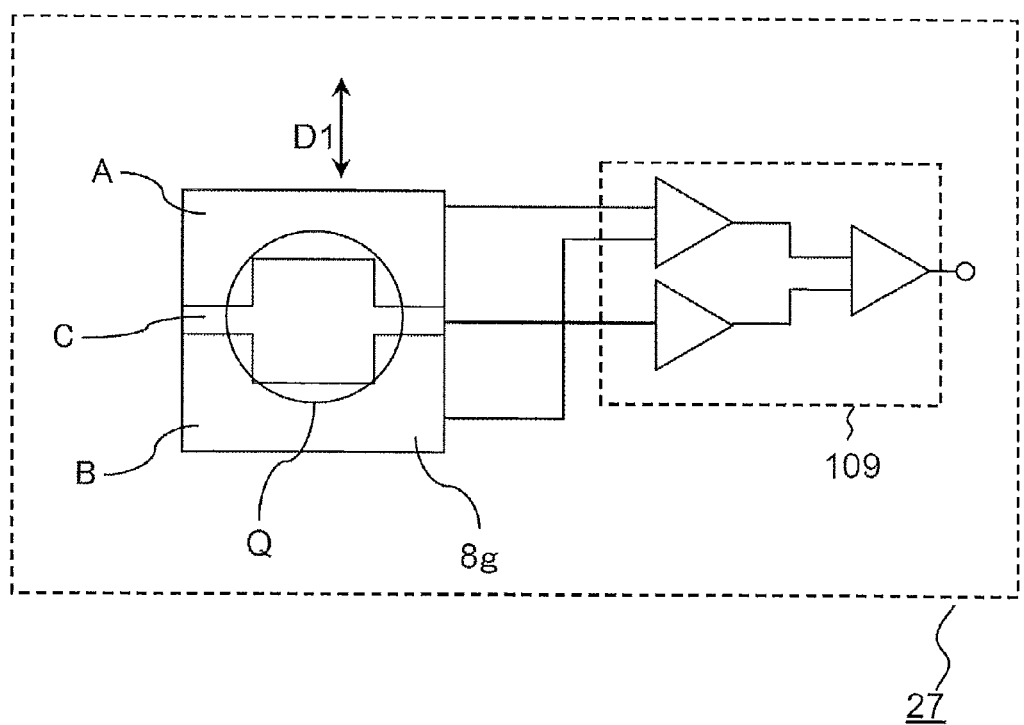
FIG. 9 is a view illustrating another light receiving surface of the optical head apparatus according to Embodiment 1 of the present invention.

Even a light receiving surface 8g as shown in FIG. 9, which receives the outer portion beam from every direction without limiting to the tangential or radial direction, has a similar effect of increasing the CN ratio. In comparison to the case where the light beam of the outer portion in either of the tangential direction or the radial direction is received, the light receiving surface 8g is more advantageous of the CN ratio because it can receive a more amount of the light beam of the outer portion. Here, the center portion is made different in width from the non-central portion so that the light receiving element C that receives the center portion beam partially makes a contact with the outline of the light receiving surface, whereby electrical signals from the light receiving element C that receives the center portion beam can easily be derived while receiving the outer portion beam from every possible direction.

While there are configurations of various kinds as described above, the invention is not limited to these, but a configuration may be one essentially similar to such configurations, or one obtained by a combination of the configurations shown in FIGS. 6 through 9.

Typically in an optical head apparatus, a light receiving device is often screw-secured or adhered using UV adhesive to an optical housing where optical components are fixed. A variation in an in-use environment such as temperature and humidity causes dimensions, etc. of such portions to vary, thereby causing in some cases a relative position of a return optical beam Q and a light receiving surface to vary with age.

A maximum value of the variation in the relative position is approximately 4 μm at present. In order to maintain the quality of the playback signal proper, preferably, the CN ratio is suppressed to a variation of 6 dB or less.

Further, from actual measured results of the CN ratio shown in FIG. 5, a positional displacement needs to be suppressed within about 13% of the radius of the return optical beam Q in order for the variation of the CN ratio to be 6 dB or less.

Thus, the radius of the return optical beam Q is set to 4 μm÷(13%)=30 μm or more; that is, the diameter thereof is set to about 60 μm or more, thereby allowing an optical head apparatus to be provided that improves reliability and quality of the playback signal.

In FIGS. 6 to 9, a detection system of the playback signal RF in the optical head apparatus according to the present invention has been described. Next, a common optical path for a detection optical system of the playback signal RF and for a sensor optical system detecting a focal point error and a tracking error will be described. However, the detection method of the signal RF is fundamentally the same as those in FIGS. 6 through 9.

Figure 10:
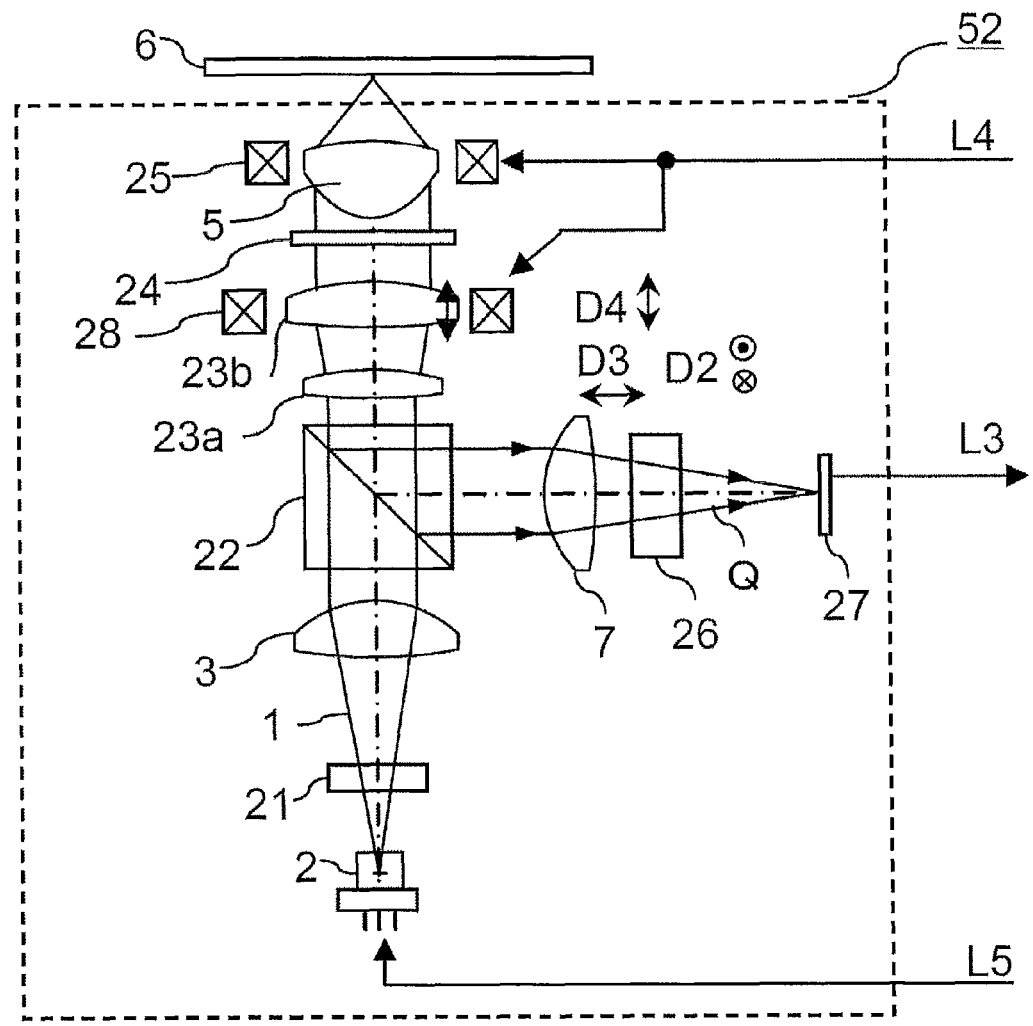
FIG. 10 is a view illustrating another optical configuration of the optical head apparatus according to Embodiment 1 of the present invention.

FIG. 10 is an example of an optical head apparatus including the sensor optical system as well. Referring to FIG. 10, the light beam 1 of the wavelength λ emitted from the semiconductor laser 2 is converted, through the diffraction element 21 separating a light beam into a plurality of light beams, into substantially collimated beams by the collimator lens 3. The light beam 1 having passed through the collimator lens 3 passes through a polarization prism 22, relay lenses 23a and 23b, and a one-quarter wavelength plate 24 converting a light beam into a substantially polarized light beam, and is focused onto the optical disk 6 by the objective lens 5. The light beam reflected by the optical disk 6, as the return optical beam Q, passes again through the objective lens 5 to be converted into a substantially collimated light beam, which passes through the relay lenses 23b and 23a and is then reflected by the polarized prism 22. The return optical beam Q reflected by the polarization prism 22 is converted by the converging lens 7 into a converged light beam that is in turn converted by a sensor device 26 into a light beam from which the playback and the servo control signals can be generated. The return optical beam Q through the sensor device 26 is received by a light receiving device 27.

Further, a drive system includes an objective lens drive actuator 25 for driving the objective lens 5 in its optical axial direction and in a substantially radial direction of the optical disk 6, and a relay lens drive actuator 28 for driving the relay lens 23b in its optical axis direction in order to vary spherical aberration of a light beam that is to be focused by the objective lens 5.

An output signal derived by the light receiving device 27 from the return optical beam Q is transmitted via the transmission line L3 to the playback signal processing circuit 56. The servo signal detection circuit 59 of the playback signal processing circuit 56 generates a focus error signal corresponding to a focus displacing amount between the object lens 5 and the optical disk 6, a tracking error signal corresponding to an off-track amount of a focus spot formed by the objective lens 5 from a data track on the optical disk 6, a spherical aberration error signal corresponding to a residual spherical aberration amount of the focus spot and the like, and the optical head control circuit 61 controls, via the transmission line L4, the objective lens drive actuator 25 and the relay lens drive actuator 28 of the optical head apparatus 52, as shown in FIG. 10.

The objective lens drive actuator 25 is used for focus control by driving the objective lens 5 in the optical axial direction, and used for tracking control to a data track formed on the optical disk 6 by driving the lens 5 in the radial direction of the optical disk 6.

Optical beams separated through the diffraction grating 21 are used for tracking error detection. However, in the case of the tracking error detection method where no separated optical beam is needed, the diffraction grating 21 may be removed.

In order for the light receiving device 27 to generate a control signal for the objective lens and a playback signal applied to others by combining its function with that of the sensor device 26, it has a light receiving surface that includes a plurality of split light receiving elements by which received light beams are converted into voltage signals, thus producing output electrical signals.

When a focus error detection scheme uses the astigmatic method, that is, when the focus control of the objective lens 5 utilizes the astigmatic method, it generally suffice if, for instance, a cylindrical lens or a hologram element that is able to add astigmatism is used for the sensor device 26. In the astigmatic method, typically, the return optical beam Q is received at a light receiving surface that is divided into four equal quadrants. The focal point error detection signal derived by the astigmatic method is used as a control signal for performing a focus control to correct an error of the focal distance of the objective lens 5 with respect to the information recording layer of the optical disk 6.

Figure 11:
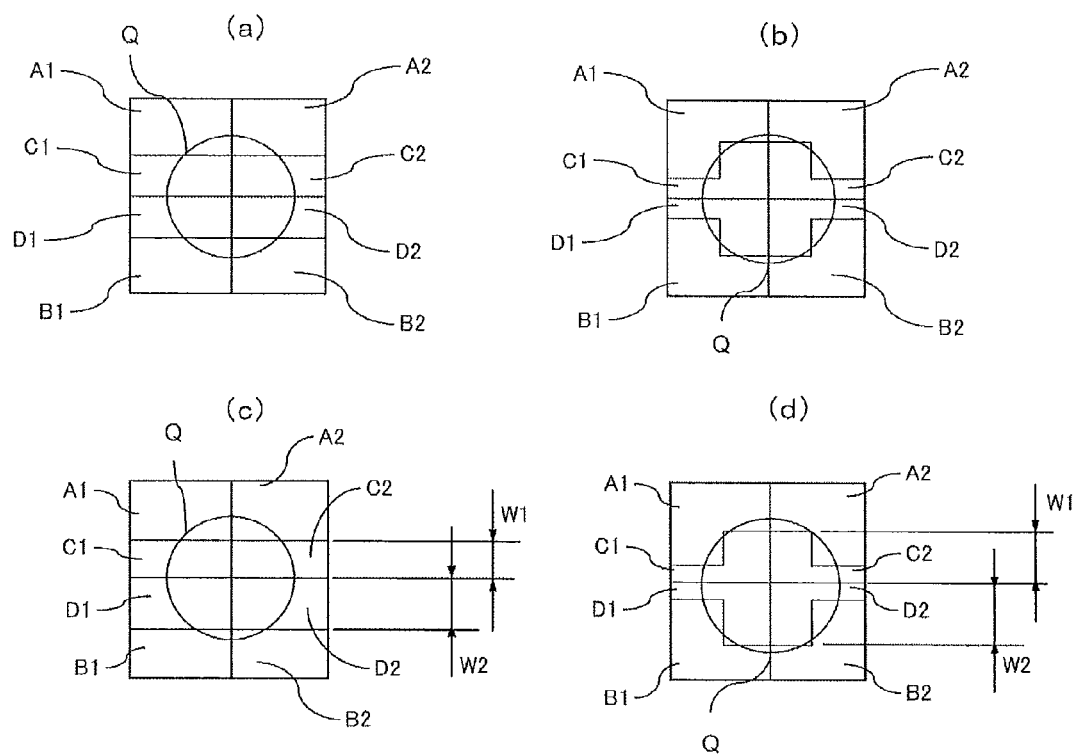
FIG. 11 shows diagrams illustrating quad-split light receiving surfaces that are used in an astigmatic method, of the optical head apparatus according to Embodiment 1 of the present invention.

The light receiving surface of FIG. 11 is configured by combining the four-split light receiving surface for use in the astigmatic method and the light receiving surface capable of individually receiving and detecting light beams of the outer portions and center portion of the return optical beam Q. Commonality of components in such optical systems, and combination of the light receiving surfaces have the advantage of reducing the size and cost of the optical head apparatus.

FIG. 11A is based on the light receiving surface, shown in FIG. 6C, having a split light receiving surface in the tangential direction or radial direction, with FIG. 11B being based on the light receiving surface shown in FIG. 9.

In the case of FIG. 11A and FIG. 11B, if signals from the light receiving elements A1, A2, B1, B2, C1, C2, D1 and D2 are designated as Sa1, Sa2, Sb1, Sb2, Sc1, Sc2, Sd1 and Sd2, then the playback signal RF and the focal point error signal FES are generated based on equations: RF=K1×(Sa1+Sa2+Sb1+Sb2)+K2×(Sc1+Sc2+Sd1+Sd2), and FES=(Sa1+Sc1+Sb2+Sd2)−(Sa2+Sc2+Sb1+Sd1), respectively.

Further, the actual measured results of the CN ratio in the tangential direction as shown in FIG. 5 show that there is created a difference of a several dB between the CN ratio in the positive side (outside) radial direction relative to the center of the return optical beam Q and that in the negative side (inside) radial direction—in the opposite direction of the positive side, which exhibits imbalance characteristics of the CN ratio in the tangential direction. Therefore, a distance from the split line between the light receiving element that detects the outer portion beam in the negative side radial direction and the light receiving element that detects the center portion beam to the center of the return optical beam Q is defined to be greater than that from the split line between the light receiving element that detects the outer portion beam in the positive side radial direction and the light receiving element that detects the center portion beam to the center of the return optical beam Q, thus allowing enhancement of the CN ratio of the playback signal.

FIG. 11C is based on the light receiving surface of FIG. 11A, while FIG. 11D is based on the light receiving surface of FIG. 11B. Further, the equations of calculating the playback signal RF and the focal point error signal FES are the same as those of FIGS. 11A and 11B described above.

A relationship between a width W1 of the light receiving elements C1 and C2 shown in FIGS. 11C and 11D and a width W2 of the light receiving elements D1 and D2 is W1<W2; the light receiving elements A1 and A2 receive the outer portion beam in the positive side radial direction, and the light receiving elements B1 and B2 receive the outer portion beam in the negative side radial direction.

On the other hand, when the focal point error detection is conducted using the astigmatic method, the most accurate focal point error signal can be provided by coinciding a point of intersection of split lines of the light receiving surface divided into four equal quadrants or that of equivalent split lines with the center of optical axis of the return optical beam Q.

Consequently, using the light receiving surfaces of FIGS. 11C and 11D, optimal alignment between the return optical beam Q and the light receiving surfaces can be made for acquiring the maximum CN ratio and the most accurate focal point error signal.

Further, by moving the converging lens 7, the sensor device 26, the relay lenses 23a and 24b or the light receiving device 27 in the D2 through D4 directions as with FIGS. 6 through 9, the adjustment can be made so that the CN ratio becomes a maximum.

As described above, in the configurations as described in reference to FIGS. 6 through 11, by providing a drive unit that moves at least one of the converging lens 7, the light-shielding element 10, the diffraction element 11, the diffraction element 12, the sensor device 26 and the light receiving device 27, a relative position of the return optical beam Q and the light receiving surface pattern of the light receiving device can be controlled so that the CN ratio becomes a maximum.

Further, when the optical head apparatus of FIGS. 4 and 10 is compatible for a plurality of different optical disk standards, this configuration may correct a variation of a radius of the return optical beam Q, resulting from the numerical aperture NA of the objective lens 5 varying according to the optical disk standard. Moreover, the return optical beam Q does not necessarily need to be focused to enter the light receiving device but may be substantially collimated light flux.

As described above, the optical head apparatus according to Embodiment 1 detects the return optical beam Q using the split light receiving surfaces having a first light receiving element for receiving the outer portions of the return optical beam Q, and a second light receiving element for receiving the center portion beam thereof, to combine together output signals from the first and second light receiving elements, so that playback signals with less low frequency noises can be generated.

Embodiment 2

Embodiment 2 will be described below with reference to FIGS. 12 through 15.

An optical head apparatus according to Embodiment 2 is such that in an optical head apparatus that emphasizes the outer portion beam having a higher CN ratio in comparison to the center portion beam of all portions of the return optical beam Q, to detect the outer portion beam, the CN ratio of the playback signal RF is improved which is a combined signal of output signals from a plurality of light receiving elements that detect the center portion beam and the outer portion beam by adjusting amplitude gains of the output signals detected with the light receiving elements.

FIGS. 12 through 15 are schematic diagrams of the light receiving device 27, showing the light receiving surface 8, the return optical beam Q, and an arithmetic operation circuit for the playback signal RF in the signal arithmetic operation unit 109. The light receiving surface 8 shown here corresponds to various surface patterns shown in FIGS. 6 through 9 and 11 in Embodiment 1 according to the invention. Another light receiving surface pattern may be applied which is shown in FIGS. 6 through 9 and 11 and except those shown in FIGS. 12 through 15.

Figure 12:
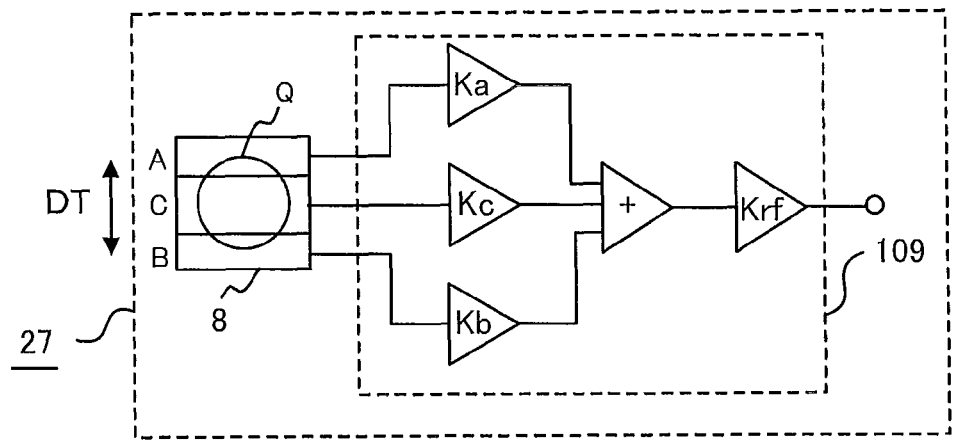
FIG. 12 is a view illustrating a light receiving surface, and an arithmetic operation on a playback signal, of an optical head apparatus according to Embodiment 2 of the present invention.

The light receiving surface pattern of FIG. 12, which is divided into three light receiving elements A through C in a direction corresponding to the tangential direction DT of the optical disk 6, includes the light receiving elements A and B—which serve as the first light receiving surface for receiving the outer portions of the return optical beam Q—and the light receiving element C—which serves as the second light receiving surface for receiving the center portion beam thereof.

A combined signal, $Ka \times Sa + Kb \times Sb$—obtained by amplifying the output signals Sa and Sb from the light receiving elements A and B by gain values Ka and Kb, respectively, to add them together—and a signal, $Kc \times Sc$—obtained by amplifying the output signal Sc from the light receiving element C by a gain value Kc—are added together. The sum signal is further amplified by the gain value Krf, to generate a playback signal based on an equation: $RF = Krf \times (Ka \times Sa + Kb \times Sb + Kc \times Sc)$. Here, the gain value Krf may be a gain value according to an Auto Gain Control (AGC) circuit so that its signal amplitude remains at a constant value.

The optical head apparatus of FIG. 12 features individual gain adjustability of the output signals from the respective light receiving elements. This allows a greater CN ratio of the playback signal RF to be achieved by making individual adjustments of the respective gains, even when there exists a relative displacement between the light receiving surface and the return optical beam Q or an asymmetrical intensity distribution of the return optical beam Q.

Figure 13:
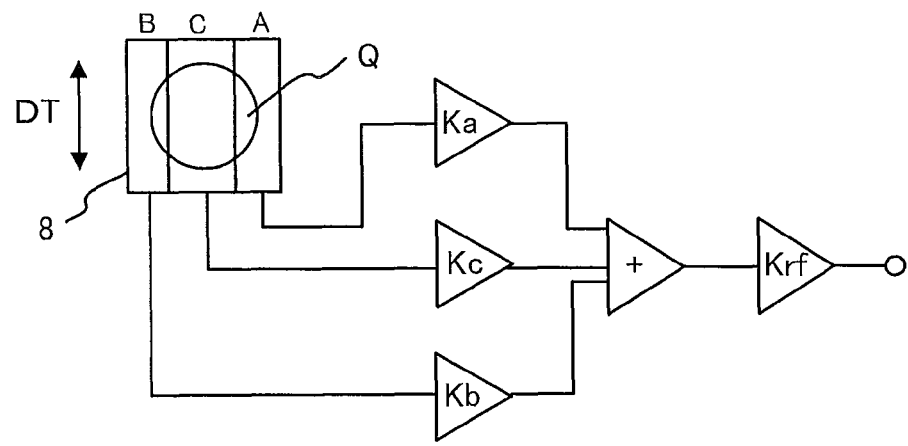
FIG. 13 is a view illustrating another light receiving surface, and an arithmetic operation on the playback signal, of the optical head apparatus according to Embodiment 2 of the present invention.

Further, a light receiving surface pattern may be used which is split in a direction corresponding to the radial direction (perpendicular to the DT direction) of the optical disk 6, as shown in FIG. 13. After deriving the outer portion and the center portion beams of the return optical beam Q, the gain values Ka, Kb and Kc are set to values that increase a proportion of the light amount in the outer portions of the return optical beam Q, so that the playback signal RF with a greater CN ratio can be obtained.

Figure 14:
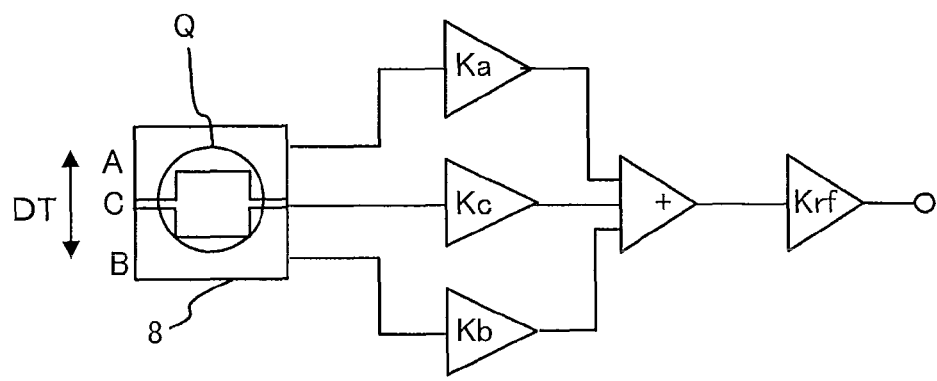
FIG. 14 is a view illustrating another light receiving surface, and an arithmetic operation on the playback signal, of the optical head apparatus according to Embodiment 2 of the present invention.

Further, even with the light receiving surface such as in FIG. 14, the playback signal RF with a greater CN ratio by signal processing as with FIG. 12.

Figure 15:
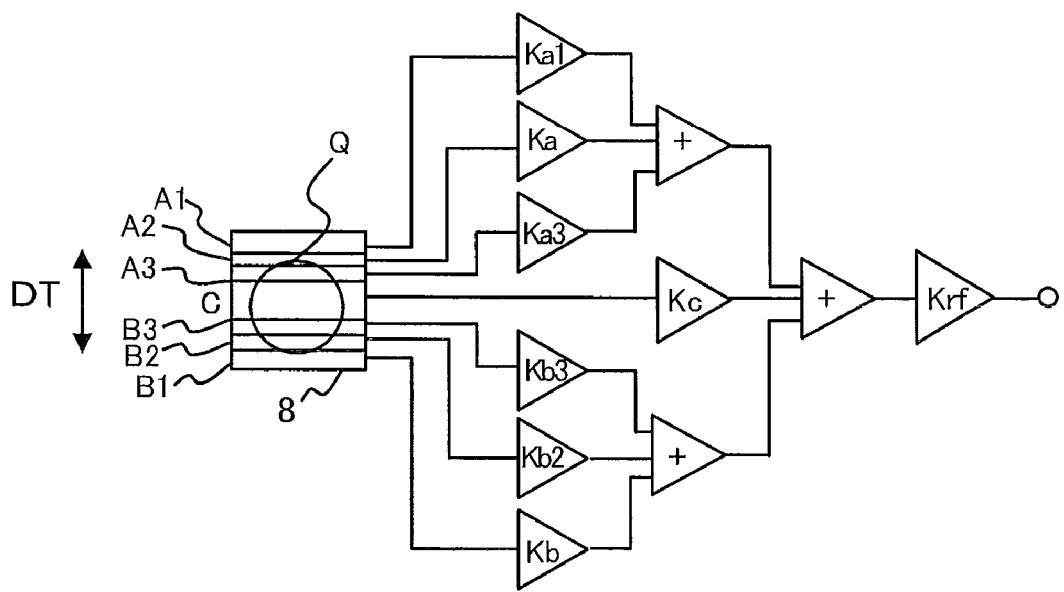
FIG. 15 is a view illustrating another light receiving surface, and an arithmetic operation method of the playback signal, of the optical head apparatus according to Embodiment 2 of the present invention.

FIG. 15 shows a light receiving surface obtained by further splitting the light receiving elements A and B—which receive the outer portions of the return optical beam Q—into three portions. Respective signals obtained by amplifying output signals Sa1 through Sa3 and Sb1 through Sb3 from the light receiving elements A1 through A3 and B1 through B3 by the gain values Ka1 through Ka3 and Kb1 through Kb3, respectively, are combined together, and a signal $Kc \times Sc$ obtained by amplifying the output signal Sc from the light receiving element C by the gain value Kc is further added to the combined signal. The sum signal is further amplified by the gain value Krf, resulting in a playback signal based on an equation: $RF = Krf \times (Ka1 \times Sa1 + Ka2 \times Sa2 + Ka3 \times Sa3 + Kb1 \times Sb1 + Kb2 \times Sb2 + Kb3 \times Sb3 + Sb + Kc \times Sc)$. Here, the gain value Krf may be a gain value according to the AGC (auto gain control) circuit so that its signal amplitude remains at a constant value.

If a light receiving surface shown in FIG. 15 is used, and even though the return optical beam Q is relatively displaced in a split direction of the light receiving element (a direction orthogonal to split lines), when the outer portions of the return optical beam Q with a relatively larger CN ratio (relatively small low frequency noise component) are detected at the light receiving elements A3 and B1, by selectively employing the detected beams, or by making the proportion of the output signals Sa3 and Sb1 larger in comparison to the other signals—more specifically, by setting gains Ka3 and Kb1 to be greater than the other gains Ka1, Ka2, Kb2 and Kb3 to perform the arithmetic operation of the signals—the play back signal with a greater CN ratio and a smaller variation can be obtained. Further, although the split direction of the light receiving surface shown in FIG. 15 is the tangential direction DT, the split direction may be determined to be the radial direction.

As described above, by unit of the light receiving device 27 capable of individually receiving the outer portions and center portion of the return optical beam Q and then of individually generating detected signals, the optical head apparatus according to Embodiment 2 is designed to allow determination of different gains for the output signals from the outer portions, and also of different gains for the output signals from the outer portions and the center portion.

Since this configuration can provide different gains to the output signals of the outer portion beams detected by a plurality of light receiving elements, the CN ratio of the playback signal RF, which is a combination of output signals from respective light receiving elements that detect the center portion and outer portion beams, can be increased when the position of the return optical beam Q and that of the light receiving surface are displaced from each other, or there exists an asymmetric distribution in intensity of the return optical beam Q.

Embodiment 3

Embodiment 3 according to the present invention will be described below with reference to FIGS. 16 through 22.

Figure 16:
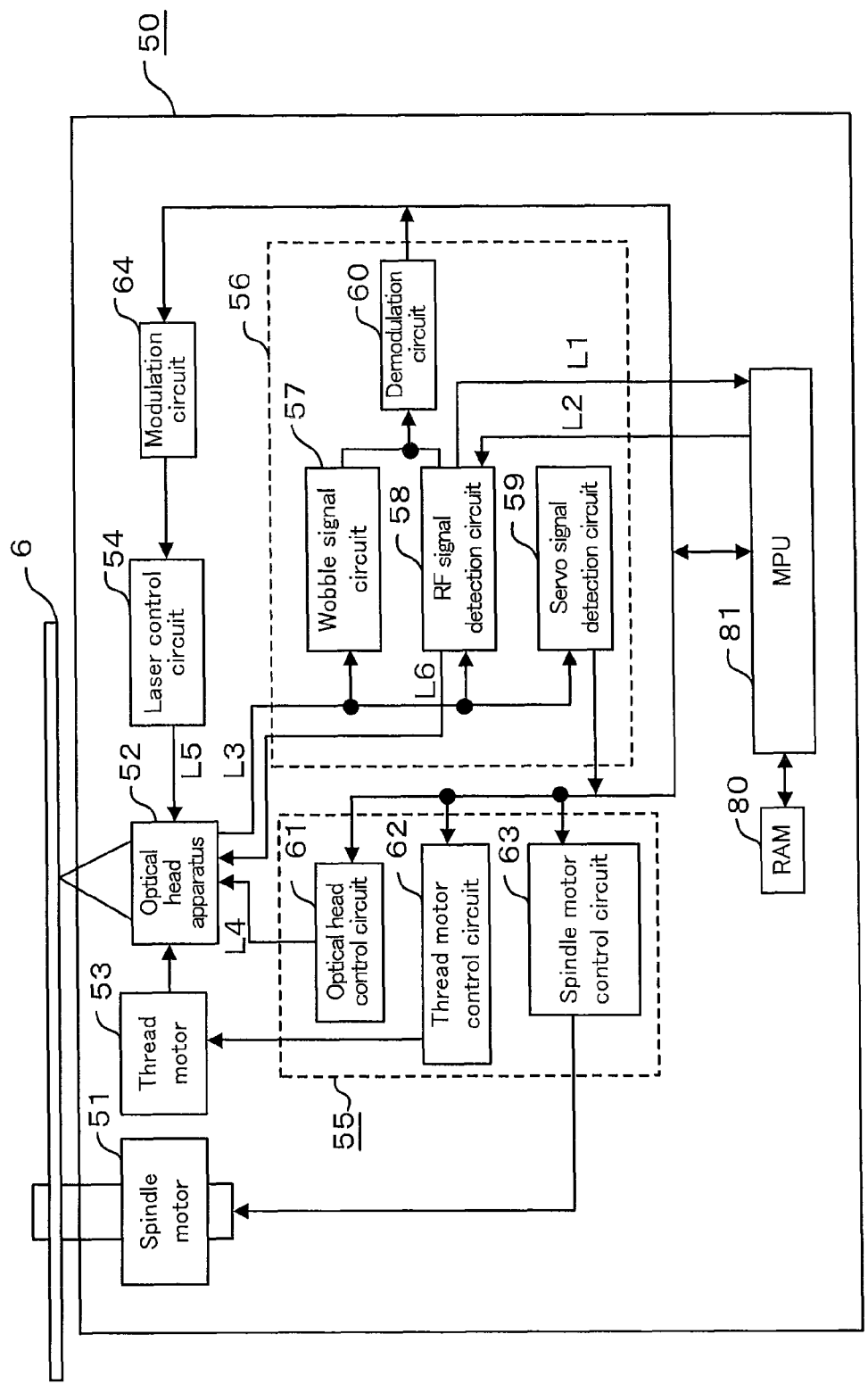
FIG. 16 is a view illustrating an overall configuration of an optical disk apparatus according to Embodiment 3 of the present invention.

FIG. 16 is a diagram showing an overall configuration of an optical disk apparatus according to Embodiment 3.

The difference from that of FIG. 1 is that a signal on a transmission line L6 from the RF signal detection circuit 58 controls an arithmetic operation circuit of the optical head apparatus 52.

Figure 17:
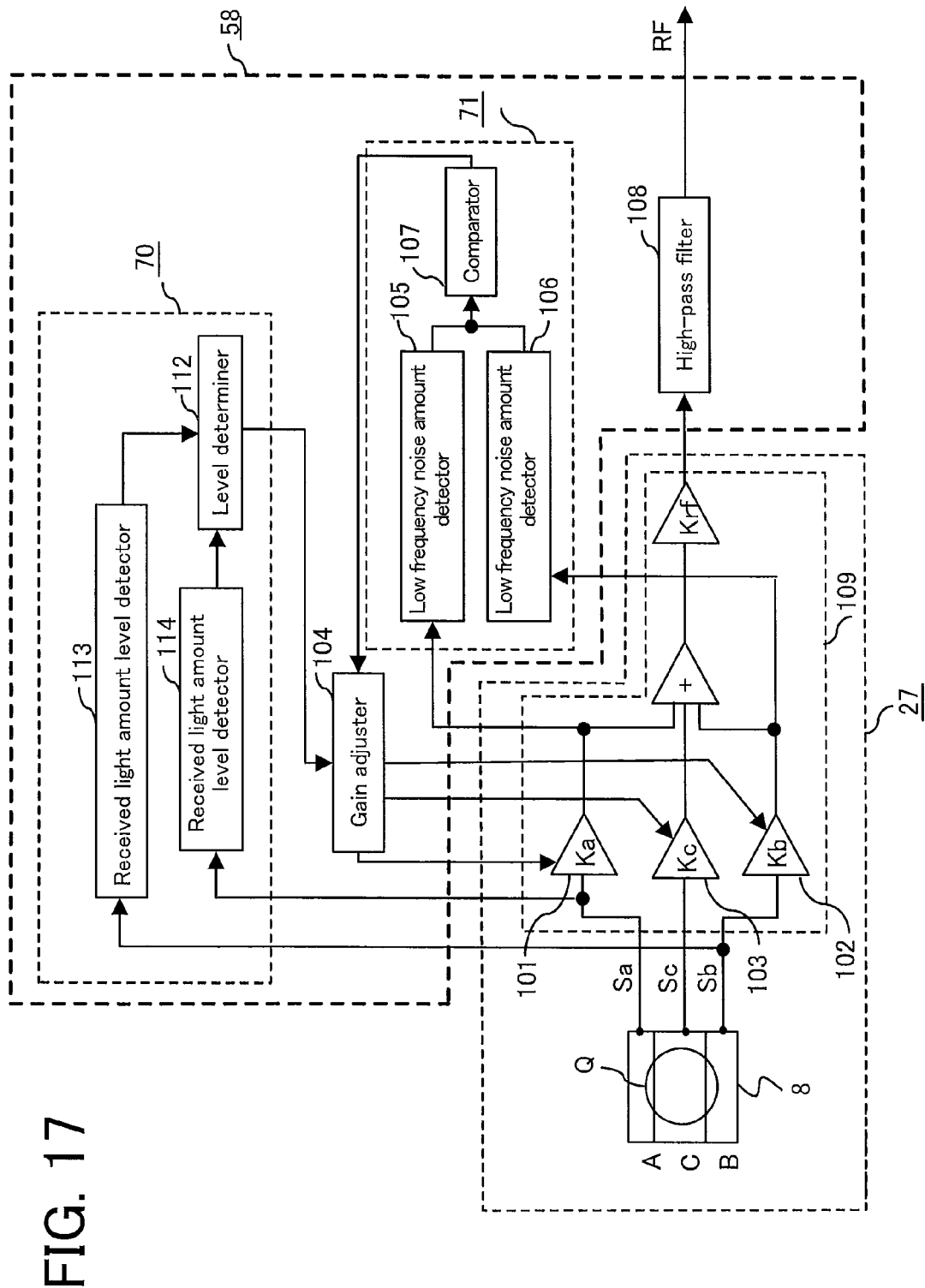
FIG. 17 is a view illustrating a configuration of a chief part of the optical disk apparatus according to Embodiment 3 of the present invention.
Figure 18:
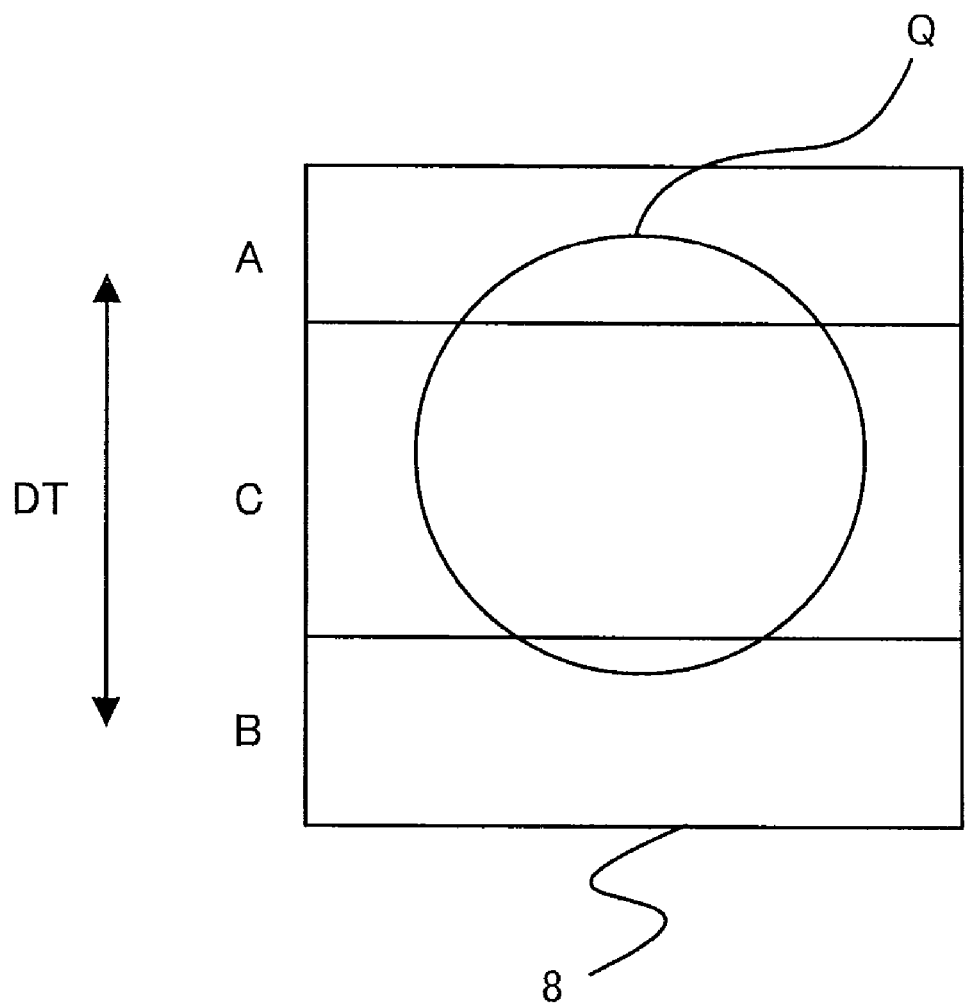
FIG. 18 is a view illustrating a relative displacement between the light receiving surface and the return optical beam of the optical head apparatus according to Embodiment 3 of the present invention.
Figure 19:
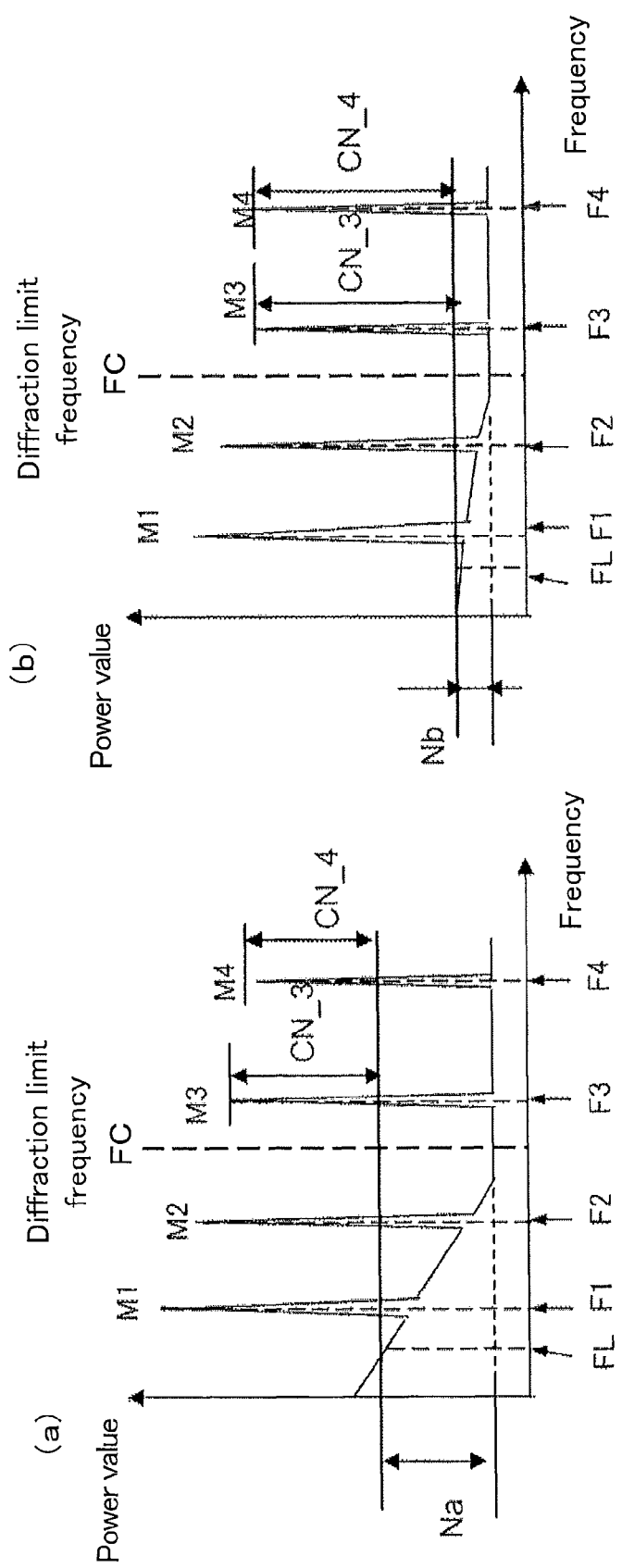
FIG. 19 shows diagrams illustrating frequency spectra for output signals of outer portions of a return optical beam detected by the optical head apparatus according to Embodiment 3 of the present invention.
Figure 20:
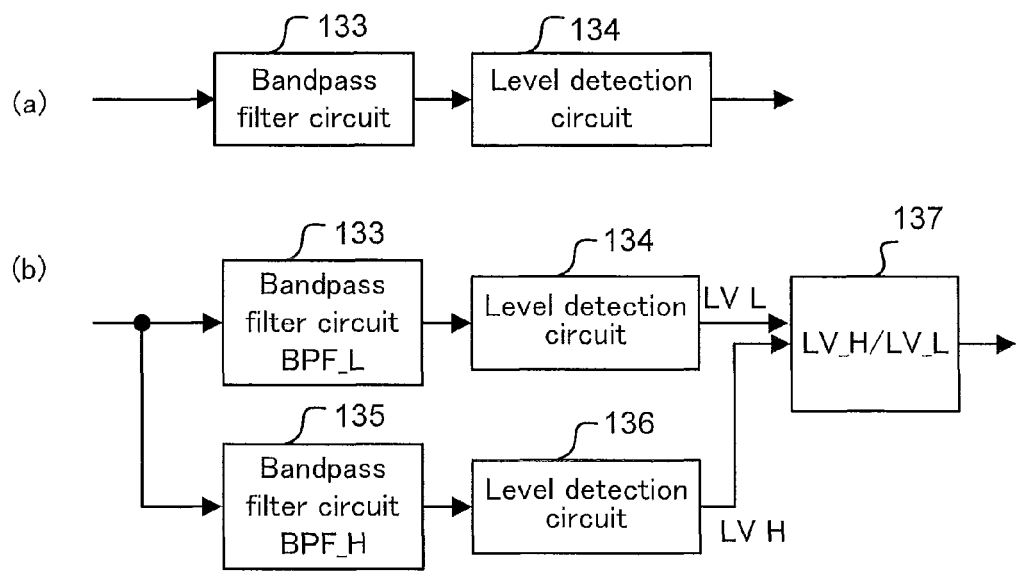
FIG. 20 shows block diagrams illustrating an example of configurations of a low frequency noise amount detector and a playback signal detector of the optical disk apparatus according to Embodiment 3 of the present invention.

What FIG. 17 shows is the optical disk apparatus according to the invention, in which only configurations of the light receiving device 27 and the RF signal detection circuit 58 are shown and the optical system from the semiconductor laser down to the light receiving surface is not depicted. The light receiving surface in FIG. 17, which corresponds to the split light receiving element of FIGS. 6 and 12 of Embodiment 1, is applicable to all light receiving surfaces that are described in the present invention.

The light receiving device 27 includes a light receiving surface divided into three light receiving elements A through C that receive the return optical beam Q, to generate output signals Sa, Sb and Sc.

The output signals Sa, Sb and Sc are applied to the signal level converters 101, 102 and 103, respectively. After those signals have been amplified by the gain values Ka, Kb and Kc that are determined according to outputs from a gain adjuster 104, the amplified signals are summed together, and the summed signal is further amplified by the gain value Krf into the playback signal RF; that is, the playback signal RF can be obtained by calculation using an equation: $RF=Krf\times(Ka\times Sa+Kb\times Sb+Kc\times Sc)$.

By passing the playback signal RF of the RF detection circuit 58 through a high-pass filter circuit 108, a frequency band of the servo control operation is removed that is sufficiently low in comparison to a playback signal band other than the low frequency noise resulting from a disk noise.

A configuration and method that reduce the low frequency noise to thereby enhance a CN ratio will be described below.

When the positions of the light receiving surface 8 of the light receiving device 27 and the return optical beam Q are displaced from each other, spectra of the output signals Sa and Sb are as those shown in FIGS. 19A and 19B, respectively; the relationship between the low frequency noises Na and Nb is: $Na>Nb$.

When, with the output signals Sa and Sb added together, the playback signal is based on an equation: $RF=Sa+Sb+Kc\times Sc$—i.e., when none of the signal level converters 101 and 102 is used, or the gains Ka and Kb are set to a value one—the amount of the center portion beam of the return optical beam Q incident on the light receiving element A is greater in comparison to that of the beam Q incident on the element C, and the total amount of light beam incident on the element A also increases, thus increasing the proportion of the output signal Sa containing much of the low frequency noise in the playback signal RF, which in turn increases read errors.

In the optical disk apparatus shown in FIG. 17, the output signals Sa and Sb are applied to noise detection unit 71 whose output signal is in turn applied to a gain adjuster 104.

In the noise detection unit 71, the output signals Sa and Sb are received by low frequency noise amount detectors 105 and 106, respectively, and the amounts of low frequency noise in the neighborhood of the frequency FL, detected thereby are supplied to a comparator 107 that performs an arithmetic operation of the difference in the amounts of the two low frequency noises, to provide a differential signal to the gain adjuster 104.

The gain adjuster 104 adjusts the gain values Ka and Kb of the signal level converters 101 and 102, respectively, based on the differential signal supplied from the comparator 107 so that the low frequency noises Na and Nb reach substantially the same level as each other, namely the differential signal of the noise reaches zero.

The gain adjuster 104 also adjusts the gain value Kc of the signal level converter 103 and the gain values Ka and Kb of the signal level converters 101 and 102 so that a ratio of a signal amplitude level of a longer record mark to a signal amplitude level of a shorter mark on the optical disk in the playback signal RF—i.e., a signal modulation ratio R—reaches or exceeds a value capable of sufficiently suppressing the read errors.

The gain adjuster 104 can also adjust the gain value Kc of the signal level converter 103 so that a jitter value of a playback signal or a read error rate after demodulating the playback signal reaches and falls below the target value.

FIG. 20A is a block diagram showing an example of a configuration of the low frequency noise detector of FIG. 17. The noise detector of FIG. 20A is configured with a band-pass filter circuit (LPF) 133 that derives a component in the neighborhood of the frequency FL of the output signal from the light receiving element and a level detection circuit 134 that detects the component level, which configuration provides a low frequency noise NL. A notch filter circuit is used, as an example of the band-pass filter circuit 133, to enable only the low frequency noise in the frequency FL to be derived, thus allowing an increase in accuracy of adjustment of the gain adjuster 104.

The low frequency noise detectors 105 and 106 of FIG. 17 may be replaced with a CN ratio detector. The CN ratio detector derives the CN ratio as described in reference to FIG. 3, to output it.

FIG. 20B shows an example of a specific configuration of the CN ratio detector. The band-pass filter BPF_L derives the low frequency noise component in the neighborhood of the frequency FL from a signal received at the CN ratio detector, and the subsequent level detection circuit 134 provides a level value LV_L. In addition, the band-pass filter BPF_H derives the signal component in the neighborhood of frequencies F3 or F4 of the playback signals of the markers M3 or M4, and the subsequent level detection circuit 136 provides a level value LV_H. Subsequently, a divider 137 determines a ratio of the level values LV_L and LV_H.

As described above, the low frequency noise generated when the light receiving device 27 and the return optical beam Q are displaced to each other can optimally be suppressed by means of the detection unit for the amount of the low frequency noise, the comparison unit for the amount of the low frequency noise supplied from the detection unit, and the gain adjustment unit. Further, the detection unit for the amount of the low frequency noise can be replaced with the CN ratio detection unit, as described above.

In order to further increase reliability in recording and playback characteristics of the optical disk apparatus, the configuration of FIG. 17 includes signal disappearance prevention unit 70. Reliability enhancement using the signal disappearance prevention unit 70 will be described below.

In the gain adjuster 104, the less the low frequency noise contained in the output signal of the light receiving element is detected, the larger the proportion of the output signal to the overall playback signal RF becomes, thus resulting in a higher gain value determined in the output signal.

However, in such situations where the return optical beam Q is not incident on the light receiving element A or B in FIG. 17, no signal component or low frequency noise component is detected from the signal from any light receiving element on which the return optical beam Q is not incident. For that reason, the gain is determined to be higher at the light receiving element on which the return optical beam Q is not incident and the gain is to be lower at the light receiving element on which the return optical beam is incident, resulting in disappearance of the signal component.

To avoid this problem, the signal disappearance prevention unit 70 causes the output signals Sa and Sb from the light receiving elements A and B that detect the outer portions of the return optical beam Q, to be received by received light amount level detectors 113 and 114, respectively, and the amounts of light received are detected; then, when either of the amounts of the received light reaches or falls below the threshold value, a level determiner 112 determines the amount of received light to be zero at the corresponding light receiving element. Then, the gain adjuster 104 provides limitation to a gain value of the light receiving element determined to be zero amount of received light so that the gain value is not set to a constant value Gc or larger, and also provides limitation to a gain value of the other light receiving element so that the gain value is not set to a constant value Go or smaller. Here, when the amount of received light contains a variation component, in order to reduce an effect of the variation component on the amount of received light to be detected, the amount of received light that is averaged for a time period such that the level of an effect of the variation component become negligible can be assumed to be a received light level of the received light amount detectors 13 and 114.

In this way, the adjustment of the gain adjuster 104 can avoid a problem such that the playback signal disappears, thus achieving high reliability for the optical disk apparatus.

Figure 21:
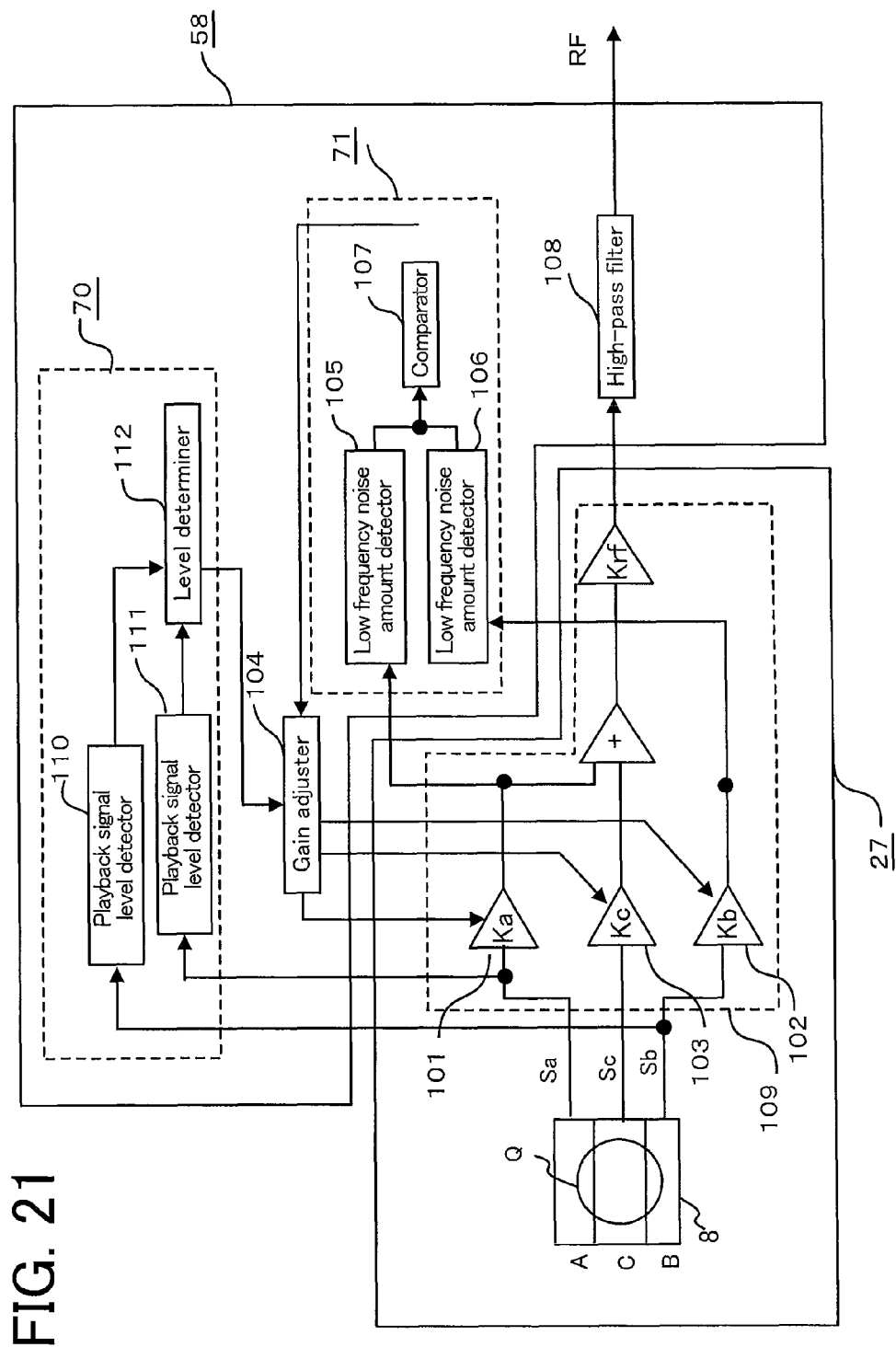
FIG. 21 is a view illustrating another configuration of the chief part of the optical disk apparatus according to Embodiment 3 of the present invention.

FIG. 21 illustrates an optical disk apparatus according to another embodiment of the invention, showing a configuration of only the light receiving device 27 and the RF signal detection circuit 58, with the optical system from the semiconductor laser up until the light receiving surface being not shown. As is the case with FIG. 17, the light receiving surface of FIG. 21 is the split light receiving element of FIGS. 6 and 12 according to Embodiment 1, and this light receiving surface is applicable to all the light receiving surfaces described in the present invention.

The difference from that of FIG. 17 is that the received light amount level detectors 113 and 114 are replaced with the playback signal level detectors 110 and 111, respectively, with other configurations remaining the same. The playback signal level detectors 110 and 111, and the level determiner 112 detect the level of the playback signal component contained in each of the output signals Sa and Sb.

Here, although the playback signal may be that of the non-super resolution of the markers M1 and M2, as exemplified in FIG. 3, the playback signal of the super resolution of the markers M3 and M4 is further advantageous. This is because more accurate determination can be made due to the fact that using the super resolution playback signal, it can directly be detected whether or not the playback signal component is contained under actual super resolution playback conditions.

The playback signal level detectors 110 and 111 are configured with similar circuits to those of FIG. 20A. A pass frequency band of the band-pass filter circuit 133 is adjusted to a frequency band containing any one of the playback frequencies F1 through F4 of the marker trains of M1 through M4 that have been recorded.

The gain adjuster 104 individually adjusts the gain values of the signal level converters 101, 102 and 103 so that if an output signal not containing the playback signal component in the output signals is detected, only the rest of the output signals are combined together to generate a playback signal.

This can avoid a problem such that the playback signal disappears, thus achieving high reliability for the optical disk apparatus.

Figure 22:
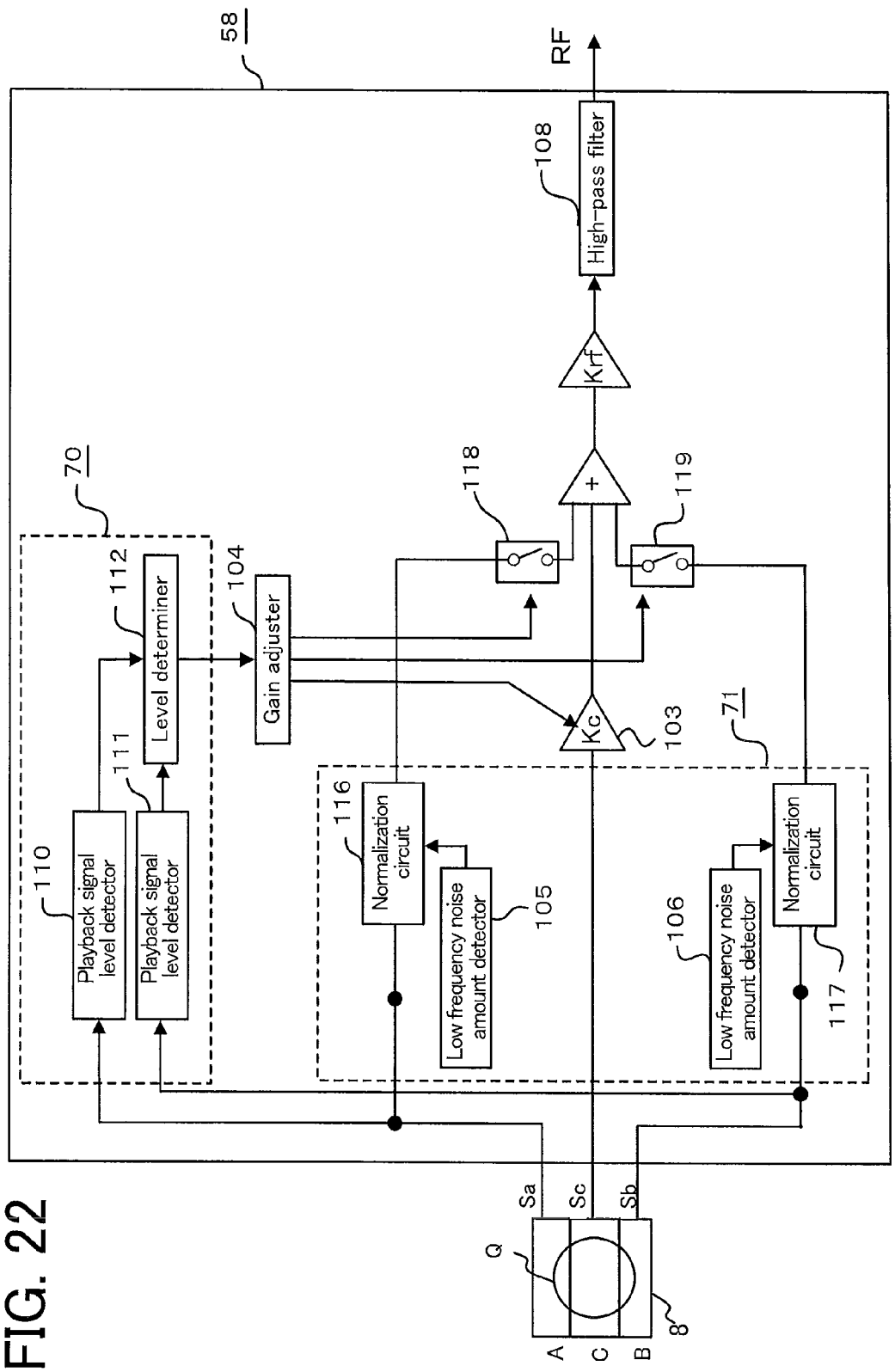
FIG. 22 is a view illustrating another configuration of the chief part of the optical disk apparatus according to Embodiment 3 of the present invention.

FIG. 22 illustrates an optical disk apparatus according to still another embodiment of the invention, showing only a configuration of the light receiving surface 8 and the RF signal detection circuit 58, with the optical system from the semiconductor laser up until the light receiving surface being not provided. The portion corresponding to the signal arithmetic operation unit 109 containing the signal level converter that converts the level of output signals from the light receiving elements into another level is included in the RF light receiving detection circuit 58 mounted on the optical disk apparatus. The low-frequency noise amount detectors 105 and 106, and the normalization circuits 116 and 117 are collectively called low noise amount detection unit 71.

The low frequency noise amount detectors 105 and 106 detect low frequency noise amounts from the output signals Sa and Sb of the light receiving elements A and B. Their output signals Sa and Sb are normalized using the low frequency noise amounts, and then the output signals Sa and Sb are summed together. Such a configuration provides an advantageous effect to reduce the proportion of an output signal with a larger low frequency noise amount.

Further, the signal disappearance prevention unit 70 constituted with the playback signal level detectors 110 and 111 and the level determiner 112, is used to control a switch circuit 118 and a switch circuit 119 so that, of the output signals, an output signal not containing a playback signal component is not used when no playback signal component is contained, but only the rest of the output signals are used, thereby avoiding a problem such that the playback signal disappears and achieving high reliability for the optical head apparatus.

Further, the playback signal level detectors 110 and 111 of FIG. 22 may be the received light amount level detector 113 and 114 as described in reference to FIG. 17. In a similar processing, when, of the output signals, no playback signal component is contained in an output signal, the switch circuits 118 and 119 are controlled so that the rest of the output signals are used, thereby avoiding the problem such that the playback signal disappears and achieving high reliability for the optical head apparatus.

As described above, the low frequency noise can be reduced even if the temporal positional displacement occurs, by providing a unit that adjusts gains of the output signals according to the low frequency noise amounts contained in the output signals from a plurality of light receiving elements.

Embodiment 4

Embodiment 4 according to the invention will be described below with reference to FIGS. 23 and 24. Embodiment 4 pertains to an optical disk that is particularly advantageously effective in the configuration illustrated in Embodiment 1 through Embodiment 3.

The optical disk in Embodiment 4 reduces the low frequency noise contained in the playback signal to be derived from the output signal from the optical head apparatus, and reduces the low frequency noise the low frequency noise when a temporal positional displacement occurs between the light receiving surface and the return optical beam Q of the optical head apparatus or when the return optical beam Q has an asymmetric intensity distribution, and also avoids disappearance of the playback signal even when the positional displacement increases, which enhances reliability and is advantageously effective to suppress the read error.

As described in Embodiment 1 through 3, when the gain adjuster 104 adjusts the gain value to reduce the low frequency noise, the playback signal level at the playback signal level detectors 110 and 111 shown in FIGS. 17, 21 and 22 is detected using a data recorded area or a contents data area of the optical disk 6, i.e., a recoding marker train of a user area UA.

Further, using the recoding marker train of the user area UA, the gain value can be adjusted by detecting the low frequency noise and the playback signal during playback operation.

However, a problem is created in that when attempting to use an optical disk with an unrecorded user area, an optimum gain adjustment cannot be made because there is no recording marker train that is required to adjust the above-described circuit gain value. The optical disk according to Embodiment 4 is for overcoming such problems.

Figure 23:
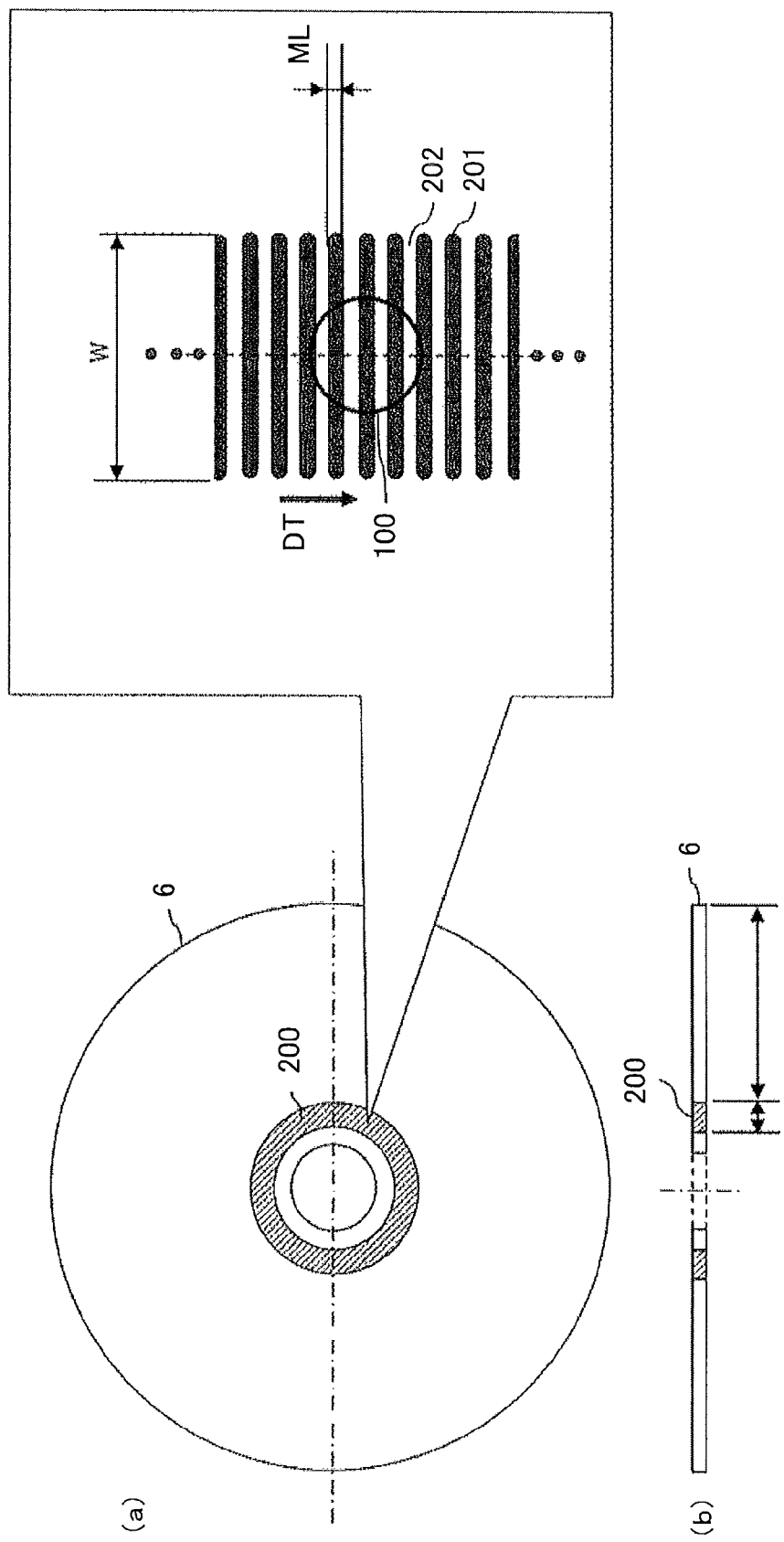
FIG. 23 is a view illustrating an optical disk according to Embodiment 4 of the present invention.
Figure 24:
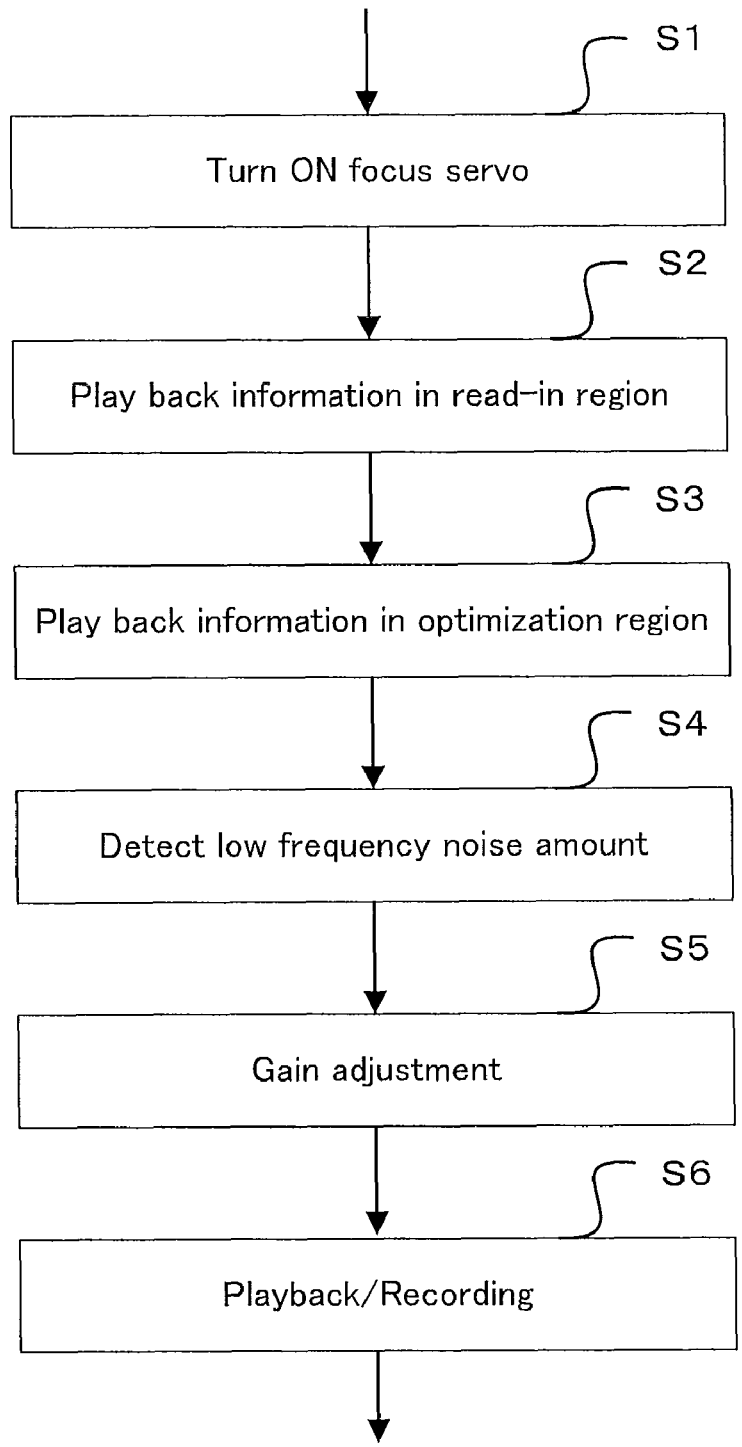
FIG. 24 is a diagram illustrating an operational sequence of recording data on or playing back data from the optical disk according to Embodiment 4 of the present invention.

FIG. 23 is a view of an optical disk according to Embodiment 4. An inner periphery region 200 is an optimization region GA where a series of record marks that can be used for the gain adjuster 104 to make a gain adjustment is provided in advance; in the figure, an enlarged illustration of a portion of the optimization region GA shows an example of the record marks of the optimization region GA. In the enlarged illustration, portions in black show the record marks with spacing therebetween and with each mark of its length ML and width W disposed at equal intervals. Numeral 100 represents a focus spot on the optical disk; the rotation of the optical disk causes the record marks to relatively move in the tangential direction of FIG. 23.

Before playing back or recording, a series of the record marks of the optimization region GA is firstly read to make an adjustment of an optimum gain value. This operation enables the gain adjustment even when a user uses an unrecorded optical disk, thus allowing the low frequency noise of the playback signal to be reduced.

Although, in FIG. 23, the optimization region GA is located in the optical disk inner periphery region 200, it may be located in the middle portion or in an outer periphery.

Further, when the optical disk 6 is a super resolution optical disk, the super resolution mask layer is also formed on the optimization region GA, whereby the gain adjustment can be made based on the same condition as an optical power condition of the focus spot in the actual super resolution playback, allowing reduction of the low frequency noise suited to the super resolution playback.

In this time, if a series of the record marks of the optimization region GA is made to include a series of marks smaller than at least the diffraction limitation, the playback signal detectors 110 and 111 detect the super resolution mark signal component when adjusting the gain, thus further ensuring the detection of the signal component disappearing.

Further, the marks may be non-super resolution marks that are longer in the mark length ML than the diffraction limitation. This makes it easy to form a series of record marks, thus achieving low costs. In this instance, the super resolution mask layer may be or may not be formed on the optimization region GA.

The series of record marks of the optimization region GA of FIG. 23 may be a series of lands and pits, and the track groove that is needed when activating a tracking servo may be further formed at the same time.

An operating procedure in which the gain adjuster 104 adjusts the gain values of the signal level converter and the RF signal detection circuit using the optical disk according to Embodiment 4 will be described with reference to the flow chart shown in FIG. 24. The operating procedure shown in the flow chart of FIG. 24 contains a step of activating a focus servo to a step of recording or playback operation, with an assumption that a determination has been completed as to the type of optical disk—i.e., the thickness of a transparent layer, a recording density, the number of recording layers, a laser wavelength, and whether or not a super resolution optical disk is used.

The optical disk 6 is inserted in the optical disk apparatus, with the focus servo activating to focus the light beam onto the optical disk (step S1). In this time, a read-in region (not shown) that bears information needed for recording and playback is played back to detect necessary parameters for recording and playback and then deliver the parameters to an MPU 81, and make preparations for playing back or recording the optical disk (step S2).

Next, the thread motor control circuit 62 controls the thread motor 53 to cause a movement of the optical head apparatus so that a focus spot comes in the optimization region GA provided in the inner periphery region 200 and then start the signal playback of the optimization region GA (step S3), and the low frequency noise amount detectors 105 and 106 detect the amount of low frequency noise contained in each of the output signals from the light receiving elements that receive the outer portions of the return optical beam Q (step S4).

Based on the amount of low frequency noise, detected in step S4, the gain adjuster 104 determines a gain value (step S5), and then playing back or recording the user contents data is started (step 6).

The tracking servo activation may be added between step S3 and step S4 if needed therebetween. However, the mark width of a series of the marks for the gain optimization, shown in FIG. 23 is kept larger in magnitude than the diameter of the focus spot, and the mark width is kept larger than a width of a variation in the radial direction at a time of the optical disk 6 rotation, due to eccentricity, etc. of the optical disk 6, whereby the playback signal component can be detected without activation of the tracking servo. While there is no limitation for the mark width W, it will generally suffice if the width is determined to be on the order of 100 μm through 1000 μm.

Although the mark width W is shown in FIG. 23 to be larger than the focus spot size, it is not limited to this width. The width may be smaller than the focus spot size, in which case, however, the tracking control is needed.

As described above, the optical disk in Embodiment 4 enables further reduction of the low frequency noise containing a small or large noise component due to a variation in the optical disk manufacture, even when there is a positional displacement between a light receiving surface of a light receiving device in the optical head apparatus and the return optical beam Q and which displacement varies with time.

In addition, as described in Embodiment 1, when a relative position of the return optical beam Q and a light receiving surface pattern of the light receiving device is configured to be controlled, the relative position thereof can be controlled using the gain adjustment region GA of the optical disk in Embodiment 4. Moreover, this region may be used for the focus control or tracking control.

The optical disk according to Embodiment 4 allows an adjustment of the gain adjustment unit mounted on the optical head apparatus in order to enhance the CN ratio of the playback signal, the drive unit of the optical component or the like, thus allowing reduction in the data read error.

What is claimed is:

1. An optical head apparatus, comprising:
a semiconductor laser;
an objective lens that focuses a light beam emitted from the semiconductor laser, to form a focus spot on an information recording layer of an optical disk; and
a light receiving device that converts into an electrical signal an amount of a return optical beam created by the focus spot being reflected by the information recording layer, to detect a playback signal of the optical disk, a focal point error, and a tracking error,
wherein the light receiving device includes a light receiving surface that is configured with a first light receiving surface that includes a plurality of light receiving elements that receives outer portions of the return optical beam, and with a second light receiving surface that includes a plurality of light receiving elements that receives a center portion of the return optical beam, the first light receiving surface and the second light receiving surface being split in a predetermined direction which is in a plane of the light receiving surface and corresponds to an orthogonal direction to a radial direction of the optical disk, at least one of the light receiving elements of the first light receiving surface being spaced from a center of a position where the return optical beam is arranged to be focused, on a positive side in the predetermined direction, by a first distance, and the other of the light receiving elements of the first light receiving surface being spaced from the center of the position where the return optical beam is arranged to be focused, on a negative side as opposed to the positive side, by a second distance which is larger than the first distance, and
a plurality of signal level converters that individually adjust levels of electrical signals received from the plurality of light receiving elements of the first light receiving surface and the plurality of light receiving elements of the second light receiving surface, the signal level converters amplifying the electrical signals received from the plurality of light receiving elements of the first light receiving surface by a first gain and amplifying the electrical signals received from the plurality of light receiving elements of the second light receiving surface by a second gain which is less than the first gain, and
wherein the playback signal generated by combining together the amplified electrical signals received from the plurality of signal level converters, is output.

2. An optical head apparatus, comprising:
a semiconductor laser;
an objective lens that focuses a light beam emitted from the semiconductor laser, to form a focus spot on an information recording layer of an optical disk; and
a light receiving device that converts into an electrical signal an amount of a return optical beam created by the focus spot being reflected by the information recording layer, to detect a playback signal of the optical disk, a focal point error, and a tracking error,
wherein the light receiving device includes a light receiving surface that is configured with a first light receiving surface that includes a plurality of light receiving elements that receives outer portions of the return optical beam, and with a second light receiving surface that includes a plurality of light receiving elements that receives a center portion of the return optical beam, the light receiving surface including a quad-split light receiving surface which has two mutually orthogonal split lines to be used in an astigmatic method for controlling focus of the objective lens, and
wherein the plurality of light receiving elements of the first light receiving surface is disposed asymmetrically with respect to an intersection point of the two mutually orthogonal split lines of the quad-split light receiving surface,
wherein a center of the return optical beam is adjusted to be disposed at the intersection point of the two mutually orthogonal split lines.

3. The optical head apparatus as recited in claim 1, wherein the first light receiving surface and the second light receiving surface are split in a direction which in a plane of the light receiving surface and corresponds to a radial direction of the optical disk.

4. The optical head apparatus as recited in claim 1, wherein the light receiving surface includes a quad-split light receiving surface which has two mutually orthogonal split lines to be used in an astigmatic method for controlling focus of the objective lens, and wherein the plurality of light receiving elements of the first light receiving surface is disposed asymmetrically with respect to an intersection point of the two mutually orthogonal split lines of the quad-split light receiving surface, wherein a center of the return optical beam is adjusted to be disposed at the intersection point of the two mutually orthogonal split lines.

* * * * *